United States Patent
Chen et al.

(10) Patent No.: US 9,014,288 B2
(45) Date of Patent: Apr. 21, 2015

(54) METHOD AND SYSTEM FOR ACQUIRING CHANNEL INFORMATION

(75) Inventors: Yijian Chen, Shenzhen (CN); Yu Ngok Li, Shenzhen (CN); Shupeng Li, Shenzhen (CN); Jun Xu, Shenzhen (CN); Xun Yang, Shenzhen (CN)

(73) Assignee: ZTE Corporation (CN)

( * ) Notice: Subject to any disclaimer, the term of this patent is extended or adjusted under 35 U.S.C. 154(b) by 229 days.

(21) Appl. No.: 13/817,831

(22) PCT Filed: Jun. 15, 2011

(86) PCT No.: PCT/CN2011/075782
§ 371 (c)(1),
(2), (4) Date: Feb. 20, 2013

(87) PCT Pub. No.: WO2011/160557
PCT Pub. Date: Dec. 29, 2011

(65) Prior Publication Data
US 2013/0202057 A1    Aug. 8, 2013

(30) Foreign Application Priority Data
Jun. 21, 2010  (CN) .......................... 2010 1 0217598

(51) Int. Cl.
| | |
|---|---|
| H04B 7/02 | (2006.01) |
| H04B 7/04 | (2006.01) |
| H04L 25/03 | (2006.01) |
| H04L 1/00 | (2006.01) |
| H04L 5/00 | (2006.01) |

(52) U.S. Cl.
CPC ............ *H04B 7/0417* (2013.01); *H04L 5/0023* (2013.01); *H04L 5/0057* (2013.01); *H04L25/03898* (2013.01); *H04L 25/03949* (2013.01); *H04B 7/0469* (2013.01); *H04L 1/0026* (2013.01); *H04L 1/0028* (2013.01)

(58) Field of Classification Search
CPC .. H04B 7/0417; H04B 7/0469; H04L 1/0026; H04L 1/0028; H04L 5/0023; H04L 5/0057; H04L 25/03898; H04L 25/03949
USPC .................................................. 375/260, 267
See application file for complete search history.

(56) References Cited

U.S. PATENT DOCUMENTS

| 8,687,555 B2 * | 4/2014 | Ko et al. ....................... 370/328 |
| 2010/0310000 A1 | 12/2010 | Ko et al. |

(Continued)

FOREIGN PATENT DOCUMENTS

| CN | 101582712 A | 11/2009 |
| CN | 101631004 A | 1/2010 |

(Continued)

OTHER PUBLICATIONS

PCT International Search Report Dated Sep. 29, 2011, Application No. PCT/CN2011/075782, Applicant ZTE Corportion et al.

*Primary Examiner* — David B. Lugo
(74) *Attorney, Agent, or Firm* — Brooks Kushman P.C.

(57) ABSTRACT

A method and system for acquiring channel information are disclosed in the present document, wherein the method includes: a base station and a User Equipment (UE) jointly saving a first codebook and at least a second codebook, and the first codebook being used for channel information quantization in various scenarios; the UE performing feedback of at least 2 Precoding Matrix Indicators (PMIs) to the base station, wherein, one PMI corresponds to one code word in the first codebook, all the other PMIs respectively correspond to different code words in a second codebook used currently, and all the code words corresponding to the fed back PMIs are used for representing channel information of one or multiple or all subbands; and after receiving the PMIs fed back from the UE, the base station finding corresponding code words from the first codebook and the second codebook used currently, and acquiring the channel information.

13 Claims, 2 Drawing Sheets

(56) References Cited

U.S. PATENT DOCUMENTS

2012/0134434 A1    5/2012    Chen et al.
2012/0219042 A1*    8/2012    Onggosanusi et al. ....... 375/219
2014/0286452 A1*    9/2014    Gomadam et al. ............ 375/267

FOREIGN PATENT DOCUMENTS

CN    101902312 A    12/2010
WO    2009096708 A1    8/2009
WO    2009099151 A1    8/2009

* cited by examiner

METHOD AND SYSTEM FOR ACQUIRING CHANNEL INFORMATION

CROSS-REFERENCE TO RELATED APPLICATIONS

This application is a U.S. national phase of PCT Application No. PCT/CN2011/075782 filed Jun. 15, 2011 which claims priority to Chinese Application No. 201010217598.1 filed Jun. 21, 2010, the disclosures of which are incorporated in their entirety by reference herein.

TECHNICAL FIELD

The present document relates to the field of communication, and particularly, to a method and system for acquiring channel information.

BACKGROUND OF THE RELATED ART

In a wireless communication system, a transmitting terminal and a receiving terminal use multiple antennas to acquire high rates in a spatial multiplexing way. Compared with the general spatial multiplexing method, an enhanced technique is the receiving terminal feeding back channel information to the transmitting terminal, and the transmitting terminal uses a transmission precoding technique according to the acquired channel information, which can enhance the transmission performance greatly. With regard to Single-User Multi-input Multi-output (SU-MIMO), channel characteristic vector information is used directly to perform precoding; and with regard to Multi-User Multi-input Multi-output (MU-MIMO), comparatively accurate information is required.

In the 3rd Generation Partnership Project (3GPP) Long Term Evolution (LTE), the feedback of channel information is mainly done by
a relatively simple feedback method of single codebook, and the performance of the transmission precoding technique of MIMO depends on the accuracy feedback from the codebook therein.

Here a basic principle of channel information quantization feedback based on the codebook is described briefly.

It is assumed that a limiting feedback channel capacity is B bps/Hz, the number of available code words is represented by $N=2^B$. A characteristic vector space of channel matrix constitutes a codebook space $\mathfrak{R} = \{F_1 F_2, L, F_N\}$ through quantization. The transmitting terminal and the receiving terminal jointly save the codebook space $\mathfrak{R}$ or produce the codebook space $\mathfrak{R}$ in real time (the codebook space $\mathfrak{R}$ is identical in the transmitting terminal and the receiving terminal). With regard to a channel H on which feedback of Channel State Information (CSI) is required to be performed, the receiving terminal selects a code word $\hat{F}$ best matching with the channel H from the codebook space $\mathfrak{R}$ according to a certain criterion, and feeds back a sequence number i of the code word $\hat{F}$ (i.e. a sequence number of the code word) to the transmitting terminal. Here, the sequence number of code word is called as a Precoding Matrix Indicator (PMI) in the codebook. The transmitting terminal finds a corresponding precoding code word $\hat{F}$ according to the sequence number i, thereby also acquiring the corresponding channel information. Wherein, $\hat{F}$ indicates the characteristic vector information of the channel.

Generally, the codebook space $\mathfrak{R}$ can further be divided into codebooks corresponding to multiple Ranks, and multiple code words corresponding to each Rank quantize precoding matrixes constituted by channel characteristic vectors under the Rank. Since the number of Ranks of the channel is equal to the number of nonzero characteristic vectors, when the number of Ranks is N, there will be N columns of the code words generally. Therefore, the codebook space $\mathfrak{R}$ can be divided into multiple sub-codebooks according to the different Ranks, as shown in Table 1.

TABLE 1

A schematic of dividing codebooks into multiple sub-codebooks according to Ranks
$\mathfrak{R}$

| Number of layers v (Rank) | | | |
|---|---|---|---|
| 1 | 2 | ... | N |
| $\mathfrak{R}_1$ Code word vector set with column number 1 | $\mathfrak{R}_2$ Code word matrix set with column number 2 | ... | $\mathfrak{R}_N$ Code word matrix set with column number N |

Wherein, when Rank>1, the code words required to be stored are all in a matrix form, wherein this feedback method of codebook quantization is used for the codebooks in an LTE protocol. LTE downlink 4-transmitting antenna codebooks are as shown in Table 2, and the limitation of precoding codebook and channel information quantization codebook are identical in fact in LTE. Hereinafter, for the sake of uniformity, the vectors also can be regarded as a matrix whose dimensionality is 1.

TABLE 2

A schematic of LTE downlink 4-transmitting antenna codebook

| Codebook index | $u_n$ | Total number of layers $\upsilon$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |

TABLE 2-continued

A schematic of LTE downlink 4-transmitting antenna codebook

| Codebook index | $u_n$ | Total number of layers $\upsilon$ | | | |
|---|---|---|---|---|---|
| | | 1 | 2 | 3 | 4 |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

Wherein, $W_n = I - 2u_n u_n^H / u_n^H u_n$, I is a unit matrix, $W_k^{(j)}$ represents the jth column of vectors of the matrix $W_k$. $W_k^{(j_1 j_2 \cdots j_n)}$ represents a matrix constituted by the $j_1, j_2, \ldots, j_n$ th column of the matrix $W_k$, and $u_n^H$ represents a conjugate transpose matrix of $u_n$; n represents a sequence number, and its values are 0~15.

In an LTE standard, a minimum feedback object of the channel information is a Subband, the channel information can correspond to one Subband, or multiple Subbands, or all Subbands. One Subband consists of multiple physical Resource Blocks (RBs) defined by the LTE, and each RB consists of multiple Resource Elements (REs). An RE is the minimum unit (corresponding to the downlink resource allocation, wherein the minimum unit fed back in uplink is the Subband) of time-frequency resources in the LTE, and it continues to use a resource representation method of the LTE in the LTE-Advanced (LTE-A). All the Subbands under all the bandwidths are defined as Widebands, and multiple Subbands under part of the bandwidths are called as Multi-Subbands.

Certain contents related to the channel information feedback in the LTE will be introduced below, and the contents which are more concerned in the present document are Precoding Matrix Indicator (PMI) information of the channel.

The channel state information feedback includes: feedback of Channel Quality Indication (CQI), Precoding Matrix Indicator (PMI) and Rank Indicator (RI). Wherein, The CQI is an index which measures the downlink channel quality. In the 36-213 protocol, the CQI is represented by integer values of 0~15 which represent different CQI grades respectively, and different CQIs correspond to their respective Modulation and Coding Scheme (MCS).

The RI is used for describing the number of independent channels in the space and corresponds to a rank of a channel response matrix. A User Equipment (UE) is required to perform feedback of RI information in an open-loop spatial multiplexing mode and a closed-loop spatial multiplexing mode, and the RI information is not required to be fed back in other modes. The rank of channel matrix corresponds to a layer number.

The PMI information describes the characteristic vector information of the channel, and the UE reports the PMI information to a base station, which enables the base station to perform precoding better. The form of codebook feedback is used. This part of contents is also the most important contents of channel information feedback.

With the development of the communication technology, since the LTE-A has higher requirements on the spectrum efficiency, the number of antennas also increases to 8, and this requires designing 8-transmitting antenna codebook feedback to perform quantization feedback of the channel information. Moreover, in order to better support the MU-MIMO, the precision of the feedback also needs to be further enhanced. It is required to design a new codebook feedback scheme.

When it is 8-antenna, the application of dual-polarized antennas is more popularized, and single-polarized antennas also have certain application scenarios, thus it is required to design codebooks appropriate for dual-polarized channels and codebooks appropriate for single-polarized channels in the feedback technology.

In the related art, one idea is: changing the tradition that one 8-antenna codebook is constituted to perform feedback of the PMI channel information of the Subband, and instead, the UE feeding back one PMI1 corresponding to one 4-antenna codebook, and the base station finding a corresponding code word WPMI1 from the 4-antenna codebook; the UE also feeding back one PMI2, and the base station finding a corresponding code word WPMI2 from another 2-antenna codebook, and using the WPMI1 and WPMI2 to represent the channel information unitedly. The base station can combine the WPMI1 and WPMI2 according to an agreed function relationship and use the obtained matrix as the acquired channel information, what are obtained can be but not limited to one 8-antenna matrix, and the function relationship can be in a product form or a Kronecker product (whose operator is represented as ⊗) form, and a principle thereof is as shown in FIG. 1.

4 antennas in the same polarization direction are equivalent to one virtual port (Virtual Port1), another 4 antennas in other polarization directions are equivalent to the other virtual port (Virtual Port2), which correspond to one 4-antenna codebook index PMI1 and one 2-antenna codebook index PMI2 respectively. According to the codebook indexes, the code word WPMI1 is found in the 4-antenna codebook and the code word WPMI2 is found in the 2-antenna codebook respectively, and thus, one 4-antenna codebook feedback and one 2-antenna codebook feedback replace one 8-antenna codebook feedback.

The characteristic vector information of the channel can be unitedly represented as:

$$\begin{bmatrix} WPMI1 & O \\ O & WPMI1 \end{bmatrix} WPMI2;$$

wherein, O represents a zero matrix, WPMI2 represents one 2×1 matrix (when it is Rank1) or one 2×2 matrix (when it is Rank2), that is, it corresponds to the code words in one 2-antenna codebook, and the UE performs feedback in the form of 2-antenna codebook.

The inventor of the application discovers that following problems exist in the related art.

Since the WPMI1 corresponds to the code words of one 4-antenna codebook, 8-antenna channel information cannot be quantized independently, and it is necessary to have information of the code words in the 2-antenna codebook corresponding to the WPMI2, and the multi-precision feedback cannot be provided. In addition, this method has a certain applicability with regard to the dual-polarized channels, but it cannot be applied to the single-polarized channels.

Moreover, the quantization accuracy of the code words in the existing codebooks is also required to be improved.

SUMMARY OF THE INVENTION

The present document provides a method and system for acquiring channel information, and the technical problem required to be solved is how to provide a multi-precision method and system, which are appropriate for both dual-polarized channels and single-polarized channels, for acquiring channel information.

In order to solve the above technical problem, the present document provides a method for acquiring channel information, wherein, the method for acquiring the channel information is a multi-precision method for acquiring channel information, and the method comprises:

a base station and a User Equipment (UE) jointly saving a first codebook and at least a second codebook, and the first codebook being used for channel information quantization in various scenarios;

the UE performing feedback of at least 2 Precoding Matrix Indicators (PMIs) to the base station, wherein, one PMI corresponds to one code word in the first codebook, all the other PMIs respectively correspond to different code words in a second codebook used currently, and each code word corresponding to the PMI which is fed back is used for representing channel information of one or multiple or all subbands; and after receiving the PMIs fed back from the UE, the base station finding corresponding code words from the first codebook and the second codebook used currently, and acquiring the channel information.

According to the above method, the base station and the UE jointly save a second codebook, and this second codebook is the second codebook used currently; or the base station and the UE jointly save multiple second codebooks used in different scenarios, the scenarios are relevant to a size of a rank, and after judging the size of the rank according to channel information, the UE determines a second codebook corresponding to the rank as the second codebook used currently; or the base station and the UE jointly save multiple second codebooks used in different scenarios, and the UE determines the second codebook used currently according to indication information carried in a signaling sent by the base station; or the base station and the UE jointly save multiple second codebooks used in different scenarios, and the UE selects the second codebook used currently and informs the base station.

According to the above method, the base station and the UE jointly save two second codebooks used in different scenarios;

after judging the size of the rank according to the channel information, if the rank is 1, the UE determines one second codebook corresponding to the rank as the second codebook used currently, and if the rank is 2, the UE determines the other second codebook corresponding to the rank as the second codebook used currently.

According to the above method, in the step of the UE performing feedback of the PMIs to the base station, the PMIs fed back are one of following situations:

a number of the PMIs fed back is S+1, corresponding code words are one code word in the first codebook and S code words in the second codebook used currently, S pairs of code words obtained by combining the code word in the first codebook and each code word in the S code words are used for representing channel information of S subbands respectively, and S is an integer greater than 1; or a number of the PMIs in the feedback is 2, and corresponding code words are one code word in the first codebook and one code word in the second codebook used currently, which are used for representing channel information of one subband; or a number of the PMIs in the feedback is 2, and corresponding code words are one code word in the first codebook and one code word in the second codebook used currently, which are used for representing channel information of one wideband.

According to the above method, code words in the first codebook can quantize channel information of 8 antennas independently, and code words in the second codebook are used for performing more precise quantization to the channel information based on the code words in the first codebook.

According to the above method, one of the second codebooks jointly saved by the base station and the UE comprises the following 4 code words:

$$\begin{bmatrix} 1 & & & & & & & \\ & 1 & & & & & & \\ & & 1 & & & & & \\ & & & 1 & & & & \\ & & & & 1 & & & \\ & & & & & 1 & & \\ & & & & & & 1 & \\ & & & & & & & 1 \end{bmatrix}, \begin{bmatrix} 1 & & & & & & & \\ & 1 & & & & & & \\ & & 1 & & & & & \\ & & & 1 & & & & \\ & & & & j & & & \\ & & & & & j & & \\ & & & & & & j & \\ & & & & & & & j \end{bmatrix}$$

$$\begin{bmatrix} 1 & & & & & & & \\ & 1 & & & & & & \\ & & 1 & & & & & \\ & & & 1 & & & & \\ & & & & -1 & & & \\ & & & & & -1 & & \\ & & & & & & -1 & \\ & & & & & & & -1 \end{bmatrix}, \begin{bmatrix} 1 & & & & & & & \\ & 1 & & & & & & \\ & & 1 & & & & & \\ & & & 1 & & & & \\ & & & & -j & & & \\ & & & & & -j & & \\ & & & & & & -j & \\ & & & & & & & -j \end{bmatrix}$$

or, one of the second codebooks jointly saved by the base station and the UE comprises the following 4 code words:

$$\begin{bmatrix} 1 & & & & & & & \\ & e^{j\frac{-\pi}{32}} & & & & & & \\ & & e^{j2\frac{-\pi}{32}} & & & & & \\ & & & e^{j3\frac{-\pi}{32}} & & & & \\ & & & & 1 & & & \\ & & & & & e^{j\frac{-\pi}{32}} & & \\ & & & & & & e^{j2\frac{-\pi}{32}} & \\ & & & & & & & e^{j3\frac{-\pi}{32}} \end{bmatrix},$$

$$\begin{bmatrix} 1 & & & & & & & \\ & e^{j\frac{-3\pi}{32}} & & & & & & \\ & & e^{j2\frac{-3\pi}{32}} & & & & & \\ & & & e^{j3\frac{-3\pi}{32}} & & & & \\ & & & & -1 & & & \\ & & & & & -e^{j\frac{-3\pi}{32}} & & \\ & & & & & & -e^{j2\frac{-3\pi}{32}} & \\ & & & & & & & -e^{j3\frac{-3\pi}{32}} \end{bmatrix}$$

$$\begin{bmatrix} 1 & & & & & & & \\ & e^{j\frac{\pi}{32}} & & & & & & \\ & & e^{j2\frac{\pi}{32}} & & & & & \\ & & & e^{j3\frac{\pi}{32}} & & & & \\ & & & & j & & & \\ & & & & & je^{j\frac{\pi}{32}} & & \\ & & & & & & je^{j2\frac{\pi}{32}} & \\ & & & & & & & je^{j3\frac{\pi}{32}} \end{bmatrix},$$

$$\begin{bmatrix} 1 & & & & & & & \\ & e^{j\frac{3\pi}{32}} & & & & & & \\ & & e^{j2\frac{3\pi}{32}} & & & & & \\ & & & e^{j3\frac{3\pi}{32}} & & & & \\ & & & & -j & & & \\ & & & & & -je^{j\frac{3\pi}{32}} & & \\ & & & & & & -je^{j2\frac{3\pi}{32}} & \\ & & & & & & & -je^{j3\frac{3\pi}{32}} \end{bmatrix}$$

or, one of the second codebooks jointly saved by the base station and the UE comprises the following 8 code words:

$$\begin{bmatrix} 1 & & & & & & & \\ & 1 & & & & & & \\ & & 1 & & & & & \\ & & & 1 & & & & \\ & & & & 1 & & & \\ & & & & & 1 & & \\ & & & & & & 1 & \\ & & & & & & & 1 \end{bmatrix}, \begin{bmatrix} 1 & & & & & & & \\ & 1 & & & & & & \\ & & 1 & & & & & \\ & & & 1 & & & & \\ & & & & j & & & \\ & & & & & j & & \\ & & & & & & j & \\ & & & & & & & j \end{bmatrix}$$

$$\begin{bmatrix} 1 & & & & & & & \\ & 1 & & & & & & \\ & & 1 & & & & & \\ & & & 1 & & & & \\ & & & & -1 & & & \\ & & & & & -1 & & \\ & & & & & & -1 & \\ & & & & & & & -1 \end{bmatrix}, \begin{bmatrix} 1 & & & & & & & \\ & 1 & & & & & & \\ & & 1 & & & & & \\ & & & 1 & & & & \\ & & & & -j & & & \\ & & & & & -j & & \\ & & & & & & -j & \\ & & & & & & & -j \end{bmatrix}$$

$$\begin{bmatrix} 1 & & & & & & & \\ & e^{j\varphi_1} & & & & & & \\ & & e^{j2\varphi_1} & & & & & \\ & & & e^{j3\varphi_1} & & & & \\ & & & & 1 & & & \\ & & & & & e^{j2\varphi_1} & & \\ & & & & & & e^{j3\varphi_1} & \\ & & & & & & & e^{j4\varphi_1} \end{bmatrix},$$

$$\begin{bmatrix} 1 & & & & & & & \\ & e^{j\varphi_2} & & & & & & \\ & & e^{j2\varphi_2} & & & & & \\ & & & e^{j3\varphi_2} & & & & \\ & & & & 1 & & & \\ & & & & & e^{j2\varphi_2} & & \\ & & & & & & e^{j3\varphi_2} & \\ & & & & & & & e^{j4\varphi_2} \end{bmatrix},$$

$$\begin{bmatrix} 1 & & & & & & & \\ & e^{j\varphi_3} & & & & & & \\ & & e^{j2\varphi_3} & & & & & \\ & & & e^{j3\varphi_3} & & & & \\ & & & & 1 & & & \\ & & & & & e^{j2\varphi_3} & & \\ & & & & & & e^{j3\varphi_3} & \\ & & & & & & & e^{j4\varphi_3} \end{bmatrix},$$

$$\begin{bmatrix} 1 & & & & & & & \\ & e^{j\varphi_4} & & & & & & \\ & & e^{j2\varphi_4} & & & & & \\ & & & e^{j3\varphi_4} & & & & \\ & & & & 1 & & & \\ & & & & & e^{j2\varphi_4} & & \\ & & & & & & e^{j3\varphi_4} & \\ & & & & & & & e^{j4\varphi_4} \end{bmatrix}$$

wherein: $\varphi_1 = \frac{-\pi}{32}, \varphi_2 = \frac{-3\pi}{32}, \varphi_3 = \frac{3\pi}{32}, \varphi_4 = \frac{\pi}{32}$;

or, one of the second codebooks jointly saved by the base station and the UE comprises: any two code words in $$\begin{bmatrix} 1 & & & & & & & \\ & 1 & & & & & & \\ & & 1 & & & & & \\ & & & 1 & & & & \\ & & & & 1 & & & \\ & & & & & 1 & & \\ & & & & & & 1 & \\ & & & & & & & 1 \end{bmatrix}, \begin{bmatrix} 1 & & & & & & & \\ & 1 & & & & & & \\ & & 1 & & & & & \\ & & & 1 & & & & \\ & & & & j & & & \\ & & & & & j & & \\ & & & & & & j & \\ & & & & & & & j \end{bmatrix}$$

$$\begin{bmatrix} 1 & & & & & & & \\ & 1 & & & & & & \\ & & 1 & & & & & \\ & & & 1 & & & & \\ & & & & -1 & & & \\ & & & & & -1 & & \\ & & & & & & -1 & \\ & & & & & & & -1 \end{bmatrix}, \begin{bmatrix} 1 & & & & & & & \\ & 1 & & & & & & \\ & & 1 & & & & & \\ & & & 1 & & & & \\ & & & & -j & & & \\ & & & & & -j & & \\ & & & & & & -j & \\ & & & & & & & -j \end{bmatrix}$$

plus any group in the following 2 groups of code words:
first group:

$$\begin{bmatrix} 1 & & & & & & & \\ & e^{ja_1} & & & & & & \\ & & e^{j2a_1} & & & & & \\ & & & e^{j3a_1} & & & & \\ & & & & 1 & & & \\ & & & & & e^{j2a_1} & & \\ & & & & & & e^{j3a_1} & \\ & & & & & & & e^{j4a_1} \end{bmatrix},$$

$$\begin{bmatrix} 1 & & & & & & & \\ & e^{ja_2} & & & & & & \\ & & e^{j2a_2} & & & & & \\ & & & e^{j3a_2} & & & & \\ & & & & 1 & & & \\ & & & & & e^{j2a_2} & & \\ & & & & & & e^{j3a_2} & \\ & & & & & & & e^{j4a_2} \end{bmatrix}$$

wherein: $a_1 = \dfrac{\pi}{16}, a_2 = \dfrac{-\pi}{16}$;

second group:

$$\begin{bmatrix} 1 & & & \\ & e^{j\theta_1} & & \\ & & O & \\ & & & e^{j7\theta_1} \end{bmatrix}, \begin{bmatrix} 1 & & & \\ & e^{j\theta_2} & & \\ & & O & \\ & & & e^{j7\theta_2} \end{bmatrix}$$

wherein: $\theta_1 = \dfrac{3\pi}{32}, \theta_2 = \dfrac{-3\pi}{32}$.

According to the above method,
one of the two second codebooks comprises the following code words:

the other second codebook comprises the following code words:

$$\begin{bmatrix} 1 & & & & & & & \\ & e^{j\varphi_1} & & & & & & \\ & & e^{j2\varphi_1} & & & & & \\ & & & e^{j3\varphi_1} & & & & \\ & & & & 1 & & & \\ & & & & & e^{j2\varphi_1} & & \\ & & & & & & e^{j3\varphi_1} & \\ & & & & & & & e^{j4\varphi_1} \end{bmatrix},$$

$$\begin{bmatrix} 1 & & & & & & & \\ & e^{j\varphi_2} & & & & & & \\ & & e^{j2\varphi_2} & & & & & \\ & & & e^{j3\varphi_2} & & & & \\ & & & & 1 & & & \\ & & & & & e^{j2\varphi_2} & & \\ & & & & & & e^{j3\varphi_2} & \\ & & & & & & & e^{j4\varphi_2} \end{bmatrix},$$

$$\begin{bmatrix} 1 & & & & & & & \\ & e^{j\varphi_3} & & & & & & \\ & & e^{j2\varphi_3} & & & & & \\ & & & e^{j3\varphi_3} & & & & \\ & & & & 1 & & & \\ & & & & & e^{j2\varphi_3} & & \\ & & & & & & e^{j3\varphi_3} & \\ & & & & & & & e^{j4\varphi_3} \end{bmatrix},$$

$$\begin{bmatrix} 1 & & & & & & & \\ & e^{j\varphi_4} & & & & & & \\ & & e^{j2\varphi_4} & & & & & \\ & & & e^{j3\varphi_4} & & & & \\ & & & & 1 & & & \\ & & & & & e^{j2\varphi_4} & & \\ & & & & & & e^{j3\varphi_4} & \\ & & & & & & & e^{j4\varphi_4} \end{bmatrix}$$

wherein: $\varphi_1 = \frac{-\pi}{32}, \varphi_2 = \frac{-3\pi}{32}, \varphi_3 = \frac{3\pi}{32}, \varphi_4 = \frac{\pi}{32}$;

or, one of the two second codebooks comprises the following code words:

$$\begin{bmatrix} 1 & & \\ & e^{j\theta_1} & \\ & O & \\ & & e^{j7\theta_1} \end{bmatrix} \begin{bmatrix} 1 & & \\ & e^{j\theta_2} & \\ & O & \\ & & e^{j7\theta_2} \end{bmatrix} \begin{bmatrix} 1 & & \\ & e^{j\theta_3} & \\ & O & \\ & & e^{j7\theta_3} \end{bmatrix}$$

$$\begin{bmatrix} 1 & & \\ & e^{j\theta_4} & \\ & O & \\ & & e^{j7\theta_4} \end{bmatrix}$$

wherein: $\theta_1 = \frac{-\pi}{64}, \theta_2 = \frac{-3\pi}{64}, \theta_3 = \frac{3\pi}{64}, \theta_4 = \frac{\pi}{64}$;

the other second codebook comprises the following code words:

$$\begin{bmatrix} 1 & & & & & & & \\ & e^{ja_1} & & & & & & \\ & & e^{j2a_1} & & & & & \\ & & & e^{j3a_1} & & & & \\ & & & & 1 & & & \\ & & & & & e^{j2a_1} & & \\ & & & & & & e^{j3a_1} & \\ & & & & & & & e^{j4a_1} \end{bmatrix},$$

$$\begin{bmatrix} 1 & & & & & & & \\ & e^{ja_2} & & & & & & \\ & & e^{j2a_2} & & & & & \\ & & & e^{j3a_2} & & & & \\ & & & & 1 & & & \\ & & & & & e^{j2a_2} & & \\ & & & & & & e^{j3a_2} & \\ & & & & & & & e^{j4a_2} \end{bmatrix}$$

$$\begin{bmatrix} 1 & & & & & & & \\ & e^{ja_3} & & & & & & \\ & & e^{j2a_3} & & & & & \\ & & & e^{j3a_3} & & & & \\ & & & & 1 & & & \\ & & & & & e^{j2a_3} & & \\ & & & & & & e^{j3a_3} & \\ & & & & & & & e^{j4a_3} \end{bmatrix},$$

$$\begin{bmatrix} 1 & & & & & & & \\ & e^{j\varphi_4} & & & & & & \\ & & e^{j2\varphi_4} & & & & & \\ & & & e^{j3\varphi_4} & & & & \\ & & & & 1 & & & \\ & & & & & e^{j2\varphi_4} & & \\ & & & & & & e^{j3\varphi_4} & \\ & & & & & & & e^{j4\varphi_4} \end{bmatrix}$$

wherein: $a_1 = \frac{-\pi}{32}, a_2 = \frac{-3\pi}{32}, a_3 = \frac{3\pi}{32}, a_4 = \frac{\pi}{32}$.

Accordingly, the present document provides a system for acquiring channel information, wherein, the system for acquiring the channel information is a multi-precision system for acquiring channel information, and the system comprises a base station and a User Equipment (UE), wherein:

the base station comprises:

a storage module, which is configured to: save a first codebook and at least a second codebook, wherein the first codebook is used for channel information quantization in various scenarios; and a channel information acquisition module, which is configured to: after receiving Precoding Matrix Indicators (PMIs) fed back from the UE, find corresponding code words from the first codebook and a second codebook used currently, and acquire the channel information;

the UE comprises:

a storage module, which is configured to: save a first codebook and at least a second codebook identical with the first codebook and the second codebook of the base station; and a channel information feedback module, which is configured to: perform feedback of at least 2 PMIs to the base station, wherein, one PMI corresponds to one code word in the first codebook, all the other PMIs respectively correspond to different code words in a second codebook used currently, and each code word corresponding to the PMIs which is fed back is used for representing channel information of one or multiple subbands.

According to the above system, the storage module of the base station and the storage module of the UE jointly save a second codebook, and this second codebook is the second codebook used currently; or the storage module of the base station and the storage module of the UE jointly save multiple second codebooks used in different scenarios, the scenarios are relevant to a size of a rank, the UE further comprises a judgment module, and the judgment module is configured to: after judging the size of the rank according to channel information, determine a second codebook corresponding to the rank as the second codebook used currently; or the storage module of the base station and the storage module of the UE jointly save multiple second codebooks used in different scenarios, the UE further comprises a judgment module, and the judgment module is configured to: determine the second codebook used currently according to indication information carried in a signaling sent by the base station; or the storage module of the base station and the storage module of the UE jointly save multiple second codebooks used in different scenarios, the UE further comprises a selection module, and the selection module is configured to: select the second codebook used currently and inform the base station.

Accordingly, the present document provides a base station which comprises:

a storage module, which is configured to: save a first codebook and at least a second codebook;

a receiving module, which is configured to: receive at least 2 Precoding Matrix Indicators (PMIs) fed back from a User Equipment (UE) to the base station and send the PMIs to a channel information acquisition module, wherein, one PMI corresponds to one code word in the first codebook, which is identical with o the first codebook stored by the base station, stored by the UE, all the other PMIs respectively correspond to different code words in the second codebook used currently, which are identical with the second codebook stored by the base station, stored by the UE, and each code word corresponding to the fed back PMIs is used for representing channel information of one or multiple subbands; and the channel information acquisition module, wherein the channel information acquisition module is configured to: after obtaining the PMIs in the feedback from the UE, find corresponding code words from the first codebook and the second codebook used currently, and acquire the channel information.

Another problem to be solved in this document is how to provide a multi-precision method for performing feedback of channel information, and thus improve the quantization precision.

To solve the above technical problem, the present document further provides a method for performing feedback of the channel information and this method is a multi-precision method for performing feedback of channel information, and the method comprises:

a UE feeding back multiple Precoding Matrix Indicators (PMIs) to a base station, wherein, one PMI corresponds to one code word in a first codebook used currently, other PMIs respectively correspond to one code word in a second codebook used currently, and the code words corresponding to the fed back PMIs are used for representing channel information of one or multiple or all subbands;

the second codebook comprises the following code words:

$$\begin{bmatrix} 1 & & & & & & & \\ & 1 & & & & & & \\ & & 1 & & & & & \\ & & & 1 & & & & \\ & & & & 1 & & & \\ & & & & & 1 & & \\ & & & & & & 1 & \\ & & & & & & & 1 \end{bmatrix}, \begin{bmatrix} 1 & & & & & & & \\ & 1 & & & & & & \\ & & 1 & & & & & \\ & & & 1 & & & & \\ & & & & j & & & \\ & & & & & j & & \\ & & & & & & j & \\ & & & & & & & j \end{bmatrix},$$

$$\begin{bmatrix} 1 & & & & & & & \\ & 1 & & & & & & \\ & & 1 & & & & & \\ & & & 1 & & & & \\ & & & & -1 & & & \\ & & & & & -1 & & \\ & & & & & & -1 & \\ & & & & & & & -1 \end{bmatrix}, \begin{bmatrix} 1 & & & & & & & \\ & 1 & & & & & & \\ & & 1 & & & & & \\ & & & 1 & & & & \\ & & & & -j & & & \\ & & & & & -j & & \\ & & & & & & -j & \\ & & & & & & & -j \end{bmatrix}$$

or, the second codebook comprises the following 4 code words:

$$\begin{bmatrix} 1 & & & & & & & \\ & e^{j\frac{-\pi}{32}} & & & & & & \\ & & e^{j2\frac{-\pi}{32}} & & & & & \\ & & & e^{j3\frac{-\pi}{32}} & & & & \\ & & & & 1 & & & \\ & & & & & e^{j\frac{-\pi}{32}} & & \\ & & & & & & e^{j2\frac{-\pi}{32}} & \\ & & & & & & & e^{j3\frac{-\pi}{32}} \end{bmatrix},$$

$$\begin{bmatrix} 1 & & & & & & & \\ & e^{j\frac{-3\pi}{32}} & & & & & & \\ & & e^{j2\frac{-3\pi}{32}} & & & & & \\ & & & e^{j3\frac{-3\pi}{32}} & & & & \\ & & & & -1 & & & \\ & & & & & -e^{j\frac{-3\pi}{32}} & & \\ & & & & & & -e^{j2\frac{-3\pi}{32}} & \\ & & & & & & & -e^{j3\frac{-3\pi}{32}} \end{bmatrix},$$

$$\begin{bmatrix} 1 & & & & & & & \\ & e^{j\frac{\pi}{32}} & & & & & & \\ & & e^{j2\frac{\pi}{32}} & & & & & \\ & & & e^{j3\frac{\pi}{32}} & & & & \\ & & & & j & & & \\ & & & & & je^{j\frac{\pi}{32}} & & \\ & & & & & & je^{j2\frac{\pi}{32}} & \\ & & & & & & & je^{j3\frac{\pi}{32}} \end{bmatrix},$$

$$\begin{bmatrix} 1 & & & & & & & \\ & e^{j\frac{3\pi}{32}} & & & & & & \\ & & e^{j2\frac{3\pi}{32}} & & & & & \\ & & & e^{j3\frac{3\pi}{32}} & & & & \\ & & & & -j & & & \\ & & & & & -je^{j\frac{3\pi}{32}} & & \\ & & & & & & -je^{j2\frac{3\pi}{32}} & \\ & & & & & & & -je^{j3\frac{3\pi}{32}} \end{bmatrix}$$

or, the second codebook comprises the following 8 code words:

$$\begin{bmatrix} 1 & & & & & & & \\ & 1 & & & & & & \\ & & 1 & & & & & \\ & & & 1 & & & & \\ & & & & 1 & & & \\ & & & & & 1 & & \\ & & & & & & 1 & \\ & & & & & & & 1 \end{bmatrix}, \begin{bmatrix} 1 & & & & & & & \\ & 1 & & & & & & \\ & & 1 & & & & & \\ & & & 1 & & & & \\ & & & & j & & & \\ & & & & & j & & \\ & & & & & & j & \\ & & & & & & & j \end{bmatrix}$$

$$\begin{bmatrix} 1 & & & & & & & \\ & 1 & & & & & & \\ & & 1 & & & & & \\ & & & 1 & & & & \\ & & & & -1 & & & \\ & & & & & -1 & & \\ & & & & & & -1 & \\ & & & & & & & -1 \end{bmatrix}, \begin{bmatrix} 1 & & & & & & & \\ & 1 & & & & & & \\ & & 1 & & & & & \\ & & & 1 & & & & \\ & & & & -j & & & \\ & & & & & -j & & \\ & & & & & & -j & \\ & & & & & & & -j \end{bmatrix}$$

$$\begin{bmatrix} 1 & & & & & & & \\ & e^{j\varphi_1} & & & & & & \\ & & e^{j2\varphi_1} & & & & & \\ & & & e^{j3\varphi_1} & & & & \\ & & & & 1 & & & \\ & & & & & e^{j2\varphi_1} & & \\ & & & & & & e^{j3\varphi_1} & \\ & & & & & & & e^{j4\varphi_1} \end{bmatrix}$$

$$\begin{bmatrix} 1 & & & & & & & \\ & e^{j\varphi_2} & & & & & & \\ & & e^{j2\varphi_2} & & & & & \\ & & & e^{j3\varphi_2} & & & & \\ & & & & 1 & & & \\ & & & & & e^{j2\varphi_2} & & \\ & & & & & & e^{j3\varphi_2} & \\ & & & & & & & e^{j4\varphi_2} \end{bmatrix}$$

$$\begin{bmatrix} 1 & & & & & & & \\ & e^{j\varphi_3} & & & & & & \\ & & e^{j2\varphi_3} & & & & & \\ & & & e^{j3\varphi_3} & & & & \\ & & & & 1 & & & \\ & & & & & e^{j2\varphi_3} & & \\ & & & & & & e^{j3\varphi_3} & \\ & & & & & & & e^{j4\varphi_3} \end{bmatrix},$$

$$\begin{bmatrix} 1 & & & & & & & \\ & e^{j\varphi_4} & & & & & & \\ & & e^{j2\varphi_4} & & & & & \\ & & & e^{j3\varphi_4} & & & & \\ & & & & 1 & & & \\ & & & & & e^{j2\varphi_4} & & \\ & & & & & & e^{j3\varphi_4} & \\ & & & & & & & e^{j4\varphi_4} \end{bmatrix}$$

wherein: $\varphi_1 = \frac{-\pi}{32}, \varphi_2 = \frac{-3\pi}{32}, \varphi_3 = \frac{3\pi}{32}, \varphi_4 = \frac{\pi}{32}$;

or, the second codebook comprises: any two code words in $$\begin{bmatrix} 1 & & & & & & & \\ & 1 & & & & & & \\ & & 1 & & & & & \\ & & & 1 & & & & \\ & & & & 1 & & & \\ & & & & & 1 & & \\ & & & & & & 1 & \\ & & & & & & & 1 \end{bmatrix}, \begin{bmatrix} 1 & & & & & & & \\ & 1 & & & & & & \\ & & 1 & & & & & \\ & & & 1 & & & & \\ & & & & j & & & \\ & & & & & j & & \\ & & & & & & j & \\ & & & & & & & j \end{bmatrix}$$

$$\begin{bmatrix} 1 & & & & & & & \\ & 1 & & & & & & \\ & & 1 & & & & & \\ & & & 1 & & & & \\ & & & & -1 & & & \\ & & & & & -1 & & \\ & & & & & & -1 & \\ & & & & & & & -1 \end{bmatrix}, \begin{bmatrix} 1 & & & & & & & \\ & 1 & & & & & & \\ & & 1 & & & & & \\ & & & 1 & & & & \\ & & & & -j & & & \\ & & & & & -j & & \\ & & & & & & -j & \\ & & & & & & & -j \end{bmatrix}$$

plus any group in the following 2 groups of code words:

first group:

$$\begin{bmatrix} 1 & & & & & & & \\ & e^{ja_1} & & & & & & \\ & & e^{j2a_1} & & & & & \\ & & & e^{j3a_1} & & & & \\ & & & & 1 & & & \\ & & & & & e^{j2a_1} & & \\ & & & & & & e^{j3a_1} & \\ & & & & & & & e^{j4a_1} \end{bmatrix},$$

$$\begin{bmatrix} 1 & & & & & & & \\ & e^{ja_2} & & & & & & \\ & & e^{j2a_2} & & & & & \\ & & & e^{j3a_2} & & & & \\ & & & & 1 & & & \\ & & & & & e^{j2a_2} & & \\ & & & & & & e^{j3a_2} & \\ & & & & & & & e^{j4a_2} \end{bmatrix}$$

wherein: $a_1 = \frac{\pi}{16}, a_2 = \frac{-\pi}{16}$;

second group:

$$\begin{bmatrix} 1 & & & \\ & e^{j\theta_1} & & \\ & & O & \\ & & & e^{j7\theta_1} \end{bmatrix}, \begin{bmatrix} 1 & & & \\ & e^{j\theta_2} & & \\ & & O & \\ & & & e^{j7\theta_2} \end{bmatrix}$$

wherein: $\theta_1 = \frac{3\pi}{32}, \theta_2 = \frac{-3\pi}{32}$.

To improve the quantization precision, the present document further provides a method for performing feedback of channel information, wherein, the method for performing feedback of the channel information is a multi-precision method for performing feedback of channel information, and the method comprises:

a base station and a UE jointly saving two second codebooks used in different scenarios; and after judging a size of a rank according to the channel information, if the rank is 1, the UE using one second codebook corresponding to the rank as a second codebook used currently, and if the rank is 2, the UE using the other second codebook corresponding to the rank as a second codebook used currently;

one of the two second codebooks comprises the following code words:

$$\begin{bmatrix} 1 & & & & & & & \\ & 1 & & & & & & \\ & & 1 & & & & & \\ & & & 1 & & & & \\ & & & & 1 & & & \\ & & & & & 1 & & \\ & & & & & & 1 & \\ & & & & & & & 1 \end{bmatrix}, \begin{bmatrix} 1 & & & & & & & \\ & 1 & & & & & & \\ & & 1 & & & & & \\ & & & 1 & & & & \\ & & & & j & & & \\ & & & & & j & & \\ & & & & & & j & \\ & & & & & & & j \end{bmatrix}$$

$$\begin{bmatrix} 1 & & & & & & & \\ & 1 & & & & & & \\ & & 1 & & & & & \\ & & & 1 & & & & \\ & & & & -1 & & & \\ & & & & & -1 & & \\ & & & & & & -1 & \\ & & & & & & & -1 \end{bmatrix}, \begin{bmatrix} 1 & & & & & & & \\ & 1 & & & & & & \\ & & 1 & & & & & \\ & & & 1 & & & & \\ & & & & -j & & & \\ & & & & & -j & & \\ & & & & & & -j & \\ & & & & & & & -j \end{bmatrix}$$

the other second codebook comprises the following code words:

$$\begin{bmatrix} 1 & & & & & & & \\ & e^{j\varphi_1} & & & & & & \\ & & e^{j2\varphi_1} & & & & & \\ & & & e^{j3\varphi_1} & & & & \\ & & & & 1 & & & \\ & & & & & e^{j2\varphi_1} & & \\ & & & & & & e^{j3\varphi_1} & \\ & & & & & & & e^{j4\varphi_1} \end{bmatrix},$$

$$\begin{bmatrix} 1 & & & & & & & \\ & e^{j\varphi_2} & & & & & & \\ & & e^{j2\varphi_2} & & & & & \\ & & & e^{j3\varphi_2} & & & & \\ & & & & 1 & & & \\ & & & & & e^{j2\varphi_2} & & \\ & & & & & & e^{j3\varphi_2} & \\ & & & & & & & e^{j4\varphi_2} \end{bmatrix},$$

$$\begin{bmatrix} 1 & & & & & & & \\ & e^{j\varphi_3} & & & & & & \\ & & e^{j2\varphi_3} & & & & & \\ & & & e^{j3\varphi_3} & & & & \\ & & & & 1 & & & \\ & & & & & e^{j2\varphi_3} & & \\ & & & & & & e^{j3\varphi_3} & \\ & & & & & & & e^{j4\varphi_3} \end{bmatrix},$$

$$\begin{bmatrix} 1 & & & & & & & \\ & e^{j\varphi_4} & & & & & & \\ & & e^{j2\varphi_4} & & & & & \\ & & & e^{j3\varphi_4} & & & & \\ & & & & 1 & & & \\ & & & & & e^{j2\varphi_4} & & \\ & & & & & & e^{j3\varphi_4} & \\ & & & & & & & e^{j4\varphi_4} \end{bmatrix}$$

wherein: $\varphi_1 = \frac{-\pi}{32}, \varphi_2 = \frac{-3\pi}{32}, \varphi_3 = \frac{3\pi}{32}, \varphi_4 = \frac{\pi}{32}$;

or, one of the two second codebooks comprises the following code words:

$$\begin{bmatrix} 1 & \\ & e^{j\theta_1} \\ & O \\ & & e^{j7\theta_1} \end{bmatrix} \begin{bmatrix} 1 & \\ & e^{j\theta_2} \\ & O \\ & & e^{j7\theta_2} \end{bmatrix} \begin{bmatrix} 1 & \\ & e^{j\theta_3} \\ & O \\ & & e^{j7\theta_3} \end{bmatrix}$$

$$\begin{bmatrix} 1 & \\ & e^{j\theta_4} \\ & O \\ & & e^{j7\theta_4} \end{bmatrix}$$

wherein: $\theta_1 = \frac{-\pi}{64}, \theta_2 = \frac{-3\pi}{64}, \theta_3 = \frac{3\pi}{64}, \theta_4 = \frac{\pi}{64}$;

the other second codebook comprises the following code words:

$$\begin{bmatrix} 1 & & & & & & & \\ & e^{ja_1} & & & & & & \\ & & e^{j2a_1} & & & & & \\ & & & e^{j3a_1} & & & & \\ & & & & 1 & & & \\ & & & & & e^{j2a_1} & & \\ & & & & & & e^{j3a_1} & \\ & & & & & & & e^{j4a_1} \end{bmatrix},$$

$$\begin{bmatrix} 1 & & & & & & & \\ & e^{ja_2} & & & & & & \\ & & e^{j2a_2} & & & & & \\ & & & e^{j3a_2} & & & & \\ & & & & 1 & & & \\ & & & & & e^{j2a_2} & & \\ & & & & & & e^{j3a_2} & \\ & & & & & & & e^{j4a_2} \end{bmatrix}$$

$$\begin{bmatrix} 1 & & & & & & & \\ & e^{ja_3} & & & & & & \\ & & e^{j2a_3} & & & & & \\ & & & e^{j3a_3} & & & & \\ & & & & 1 & & & \\ & & & & & e^{j2a_3} & & \\ & & & & & & e^{j3a_3} & \\ & & & & & & & e^{j4a_3} \end{bmatrix},$$

$$\begin{bmatrix} 1 & & & & & & & \\ & e^{ja_4} & & & & & & \\ & & e^{j2a_4} & & & & & \\ & & & e^{j3a_4} & & & & \\ & & & & 1 & & & \\ & & & & & e^{j2a_4} & & \\ & & & & & & e^{j3a_4} & \\ & & & & & & & e^{j4a_4} \end{bmatrix}$$

wherein: $a_1 = \frac{-\pi}{32}, a_2 = \frac{-3\pi}{32}, a_3 = \frac{3\pi}{32}, a_4 = \frac{\pi}{32}$.

In the method for acquiring the channel information provided by the present document, multi-precision and multi-codebook joint feedback is used, which is appropriate for both dual-polarized channels and single-polarized channels, and the code words of the second codebook can be specially set to enhance the quantization precision.

PREFERRED EMBODIMENTS OF THE PRESENT INVENTION

In order to make the object, technical scheme and advantages of the present document more clear, the examples of the present document will be described in detail in combination with the accompanying drawings below. It should be noted that the examples in the present document and the characteristics in the examples can be optionally combined with each other in the condition of no conflict.

Example 1

Figure 1:
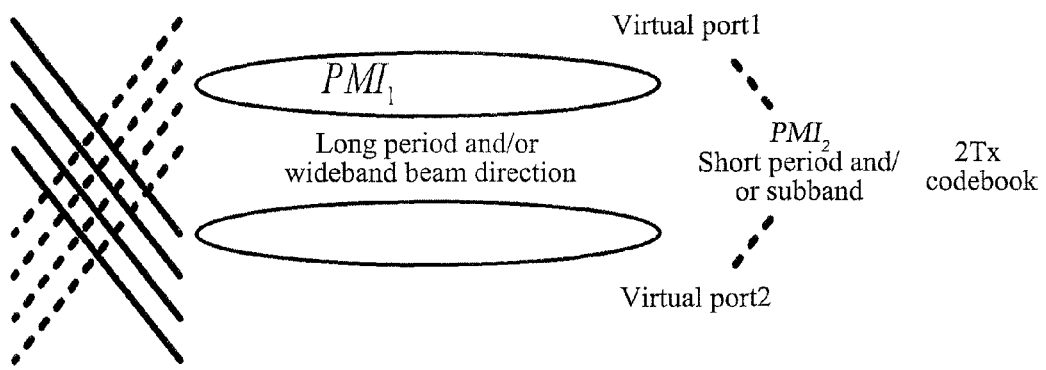
FIG. 1 is a schematic diagram of the method for acquiring PMI channel information of subband in the related art.
Figure 2:
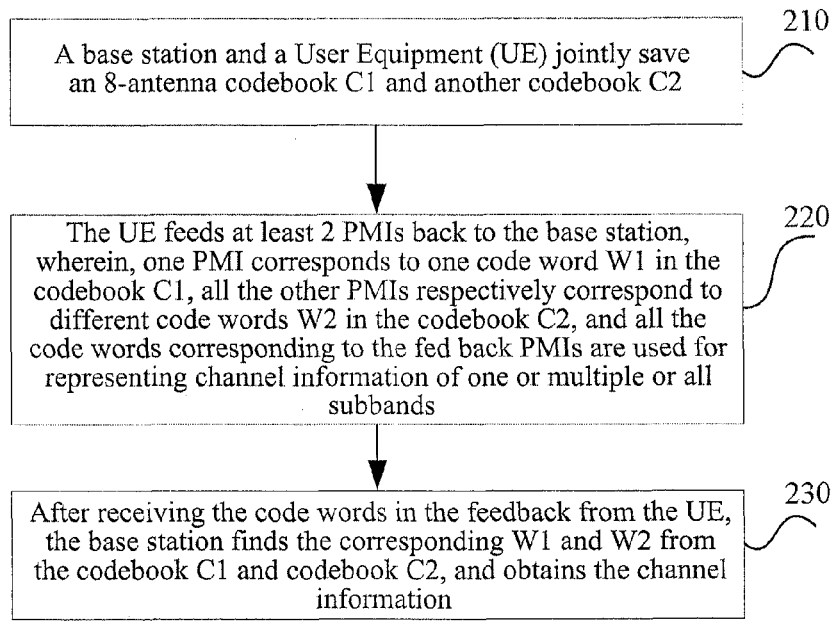
FIG. 2 is a flow diagram of the method according to the example 1 of the present document.

As shown in FIG. 2, the flow of the method in the example includes the following steps.

In step 210, a base station and a User Equipment (UE) jointly save an 8-antenna codebook C1 and another codebook C2.

In the example, the codebook C1 is a codebook uniformly applicable to various scenarios of single-polarized antennas and dual-polarized antennas and so on. Code words in the codebook C1 can quantize code words of channel information of 8 antennas independently. Code words in the codebook C2 are used for performing more accurate quantization on the channel information based on the code words in the codebook C1. In the present document, the codebook C1 also can be called as a first codebook, and the codebook C2 also can be called as a second codebook.

In step 220, the UE feeds at least 2 PMIs back to the base station, wherein, one PMI corresponds to one code word W1 in the codebook C1, every other PMI corresponds to one code word C2 in the codebook C2 (that is, all the other PMIs respectively correspond to different code words W2 in the codebook C2), and all the code words corresponding to the fed back PMIs are used for representing channel information of one or multiple or all subbands.

In a communication system, the UE generally performs estimation on channels to obtain channel information of each RE or RB or Subband through downlink pilot measurement. After obtaining comparatively accurate channel information, the UE judges an RI of the current channel, and selects the W1 which represents channel information (mainly characteristic vector information) of a Wideband from the codebook C1 according to the channel information. Since the size of the codebook C1 is limited, the W1 is channel quantization information with limited precision and is appropriate for representing the channel information of the Wideband.

The UE can select at least one W2 from the codebook C2 according to the channel information, and the W2 cannot represent the channel information independently, but if the W2 and W1 are used, the channel information of one Subband or Multi-Subband or Wideband can be represented more accurately, which enhances the feedback precision based on the W1.

The UE performing feedback of the PMIs corresponding to the W1 and W2 and representing the channel information to the base station can be:

performing feedback of S+1 PMIs, corresponding to 1 W1 and S W2, and S pairs of code words obtained by combining the W1 and each W2 respectively representing the channel information of one Subband, wherein S is an integer greater than 1;

performing feedback of 2 PMIs, corresponding to 1 W1 and 1 W2, and representing the channel information one Subband;

performing feedback of 2 PMIs, corresponding to 1 W1 and 1 W2, and representing the channel information the Wideband.

In step 230, after receiving the code words in the feedback from the UE, the base station finds the corresponding W1 and W2 from the codebook C1 and codebook C2, and obtains the channel information.

The obtaining of the channel information according to the code words can refer to the descriptions in the background of the related art.

In one example, the codebook C1 jointly saved by the base station and the terminal is shown as follows, and the present document is not limited to this.

| Index | U | K |
|---|---|---|
| 0 | $u_0$ | $\begin{bmatrix} 1 & 1 \\ -1 & 1 \end{bmatrix}$ |
| 1 | $u_1$ | $\begin{bmatrix} 1 & 1 \\ -1 & 1 \end{bmatrix}$ |
| 2 | $u_2$ | $\begin{bmatrix} 1 & 1 \\ -1 & 1 \end{bmatrix}$ |
| 3 | $u_3$ | $\begin{bmatrix} 1 & 1 \\ -1 & 1 \end{bmatrix}$ |
| 4 | $u_4$ | $\begin{bmatrix} 1 & 1 \\ -1 & 1 \end{bmatrix}$ |
| 5 | $u_5$ | $\begin{bmatrix} 1 & 1 \\ -1 & 1 \end{bmatrix}$ |
| 6 | $u_6$ | $\begin{bmatrix} 1 & 1 \\ -1 & 1 \end{bmatrix}$ |
| 7 | $u_7$ | $\begin{bmatrix} 1 & 1 \\ -1 & 1 \end{bmatrix}$ |
| 8 | $u_8$ | $\begin{bmatrix} 1 & 1 \\ -1 & 1 \end{bmatrix}$ |
| 9 | $u_9$ | $\begin{bmatrix} 1 & 1 \\ -1 & 1 \end{bmatrix}$ |
| 10 | $u_{10}$ | $\begin{bmatrix} 1 & 1 \\ -1 & 1 \end{bmatrix}$ |
| 11 | $u_{11}$ | $\begin{bmatrix} 1 & 1 \\ -1 & 1 \end{bmatrix}$ |
| 12 | $u_{12}$ | $\begin{bmatrix} 1 & 1 \\ -1 & 1 \end{bmatrix}$ |
| 13 | $u_{13}$ | $\begin{bmatrix} 1 & 1 \\ -1 & 1 \end{bmatrix}$ |
| 14 | $u_{14}$ | $\begin{bmatrix} 1 & 1 \\ -1 & 1 \end{bmatrix}$ |
| 15 | $u_{15}$ | $\begin{bmatrix} 1 & 1 \\ -1 & 1 \end{bmatrix}$ |

The definitions of $u_0 \sim u_{15}$ are the same as the definitions in the LTE codebooks in the background of the related art.

The code words corresponding to different Ranks in the codebook C1 are as shown in the following table.

| Index | Rank1 | Rank 2 |
|---|---|---|
| 0 | $M_0(:,1)$ | $[M_0(:,1)\ M_0(:,5)]$ |
| 1 | $M_1(:,1)$ | $[M_1(:,1)\ M_1(:,5)]$ |
| 2 | $M_2(:,1)$ | $[M_2(:,1)\ M_2(:,5)]$ |
| 3 | $M_3(:,1)$ | $[M_3(:,1)\ M_3(:,5)]$ |
| 4 | $M_4(:,1)$ | $[M_4(:,1)\ M_4(:,5)]$ |
| 5 | $M_5(:,1)$ | $[M_5(:,1)\ M_5(:,5)]$ |
| 6 | $M_6(:,1)$ | $[M_6(:,1)\ M_6(:,5)]$ |
| 7 | $M_7(:,1)$ | $[M_7(:,1)\ M_7(:,5)]$ |
| 8 | $M_8(:,1)$ | $[M_8(:,1)\ M_8(:,5)]$ |
| 9 | $M_9(:,1)$ | $[M_9(:,1)\ M_9(:,5)]$ |
| 10 | $M_{10}(:,1)$ | $[M_{10}(:,1)\ M_{10}(:,5)]$ |
| 11 | $M_{11}(:,1)$ | $[M_{11}(:,1)\ M_{11}(:,5)]$ |
| 12 | $M_{12}(:,1)$ | $[M_{12}(:,1)\ M_{12}(:,5)]$ |

| Index | Rank1 | Rank 2 |
|---|---|---|
| 13 | $M_{13}(:,1)$ | $[M_{13}(:,1) \; M_{13}(:,5)]$ |
| 14 | $M_{14}(:,1)$ | $[M_{14}(:,1) \; M_{14}(:,5)]$ |
| 15 | $M_{15}(:,1)$ | $[M_{15}(:,1) \; M_{15}(:,5)]$ |

Wherein, $M_n = K_n \otimes W_n$, n=0 ... 15, $W_n = I - 2u_n u_n^H / u_n^H u_n$, I is a unit matrix, and $u_n^H$ represents a conjugate transpose matrix of $u_n$, $M_n(:,j)$ represents the jth column of vectors of the matrix $M_n$. $[M_n(:,j_1) \; M_n(:,j_2)]$ represents a matrix constituted by the $j_1, j_2$th column of matrix $M_n$.

In one example, the codebook C2 includes the following 4 code words which are appropriate for both dual-polarized channels and single-polarized channels:

$$\begin{bmatrix} 1 & & & & & & & \\ & 1 & & & & & & \\ & & 1 & & & & & \\ & & & 1 & & & & \\ & & & & 1 & & & \\ & & & & & 1 & & \\ & & & & & & 1 & \\ & & & & & & & 1 \end{bmatrix}, \begin{bmatrix} 1 & & & & & & & \\ & 1 & & & & & & \\ & & 1 & & & & & \\ & & & 1 & & & & \\ & & & & j & & & \\ & & & & & j & & \\ & & & & & & j & \\ & & & & & & & j \end{bmatrix}$$

$$\begin{bmatrix} 1 & & & & & & & \\ & 1 & & & & & & \\ & & 1 & & & & & \\ & & & 1 & & & & \\ & & & & -1 & & & \\ & & & & & -1 & & \\ & & & & & & -1 & \\ & & & & & & & -1 \end{bmatrix}, \begin{bmatrix} 1 & & & & & & & \\ & 1 & & & & & & \\ & & 1 & & & & & \\ & & & 1 & & & & \\ & & & & -j & & & \\ & & & & & -j & & \\ & & & & & & -j & \\ & & & & & & & -j \end{bmatrix}$$

In another example, the codebook C2 includes the following 4 code words which are appropriate for both dual-polarized channels and single-polarized channels:

$$\begin{bmatrix} 1 & & & & & & & \\ & e^{j\frac{-\pi}{32}} & & & & & & \\ & & e^{j2\frac{-\pi}{32}} & & & & & \\ & & & e^{j3\frac{-\pi}{32}} & & & & \\ & & & & 1 & & & \\ & & & & & e^{j\frac{-\pi}{32}} & & \\ & & & & & & e^{j2\frac{-\pi}{32}} & \\ & & & & & & & e^{j3\frac{-\pi}{32}} \end{bmatrix},$$

$$\begin{bmatrix} 1 & & & & & & & \\ & e^{j\frac{-3\pi}{32}} & & & & & & \\ & & e^{j2\frac{-3\pi}{32}} & & & & & \\ & & & e^{j3\frac{-3\pi}{32}} & & & & \\ & & & & -1 & & & \\ & & & & & -e^{j\frac{-3\pi}{32}} & & \\ & & & & & & -e^{j2\frac{-3\pi}{32}} & \\ & & & & & & & -e^{j3\frac{-3\pi}{32}} \end{bmatrix}$$

$$\begin{bmatrix} 1 & & & & & & & \\ & e^{j\frac{\pi}{32}} & & & & & & \\ & & e^{j2\frac{\pi}{32}} & & & & & \\ & & & e^{j3\frac{\pi}{32}} & & & & \\ & & & & j & & & \\ & & & & & je^{j\frac{\pi}{32}} & & \\ & & & & & & je^{j2\frac{\pi}{32}} & \\ & & & & & & & je^{j3\frac{\pi}{32}} \end{bmatrix},$$

$$\begin{bmatrix} 1 & & & & & & & \\ & e^{j\frac{3\pi}{32}} & & & & & & \\ & & e^{j2\frac{3\pi}{32}} & & & & & \\ & & & e^{j3\frac{3\pi}{32}} & & & & \\ & & & & -j & & & \\ & & & & & -je^{j\frac{3\pi}{32}} & & \\ & & & & & & -je^{j2\frac{3\pi}{32}} & \\ & & & & & & & -je^{j3\frac{3\pi}{32}} \end{bmatrix}$$

In another example, the codebook C2 includes the following 8 code words which are appropriate for both dual-polarized channels and single-polarized channels:

$$\begin{bmatrix} 1 & & & & & & & \\ & 1 & & & & & & \\ & & 1 & & & & & \\ & & & 1 & & & & \\ & & & & 1 & & & \\ & & & & & 1 & & \\ & & & & & & 1 & \\ & & & & & & & 1 \end{bmatrix}, \begin{bmatrix} 1 & & & & & & & \\ & 1 & & & & & & \\ & & 1 & & & & & \\ & & & 1 & & & & \\ & & & & j & & & \\ & & & & & j & & \\ & & & & & & j & \\ & & & & & & & j \end{bmatrix}$$

$$\begin{bmatrix} 1 & & & & & & & \\ & 1 & & & & & & \\ & & 1 & & & & & \\ & & & 1 & & & & \\ & & & & -1 & & & \\ & & & & & -1 & & \\ & & & & & & -1 & \\ & & & & & & & -1 \end{bmatrix}, \begin{bmatrix} 1 & & & & & & & \\ & 1 & & & & & & \\ & & 1 & & & & & \\ & & & 1 & & & & \\ & & & & -j & & & \\ & & & & & -j & & \\ & & & & & & -j & \\ & & & & & & & -j \end{bmatrix},$$

$$\begin{bmatrix} 1 & & & & & & & \\ & e^{j\varphi_1} & & & & & & \\ & & e^{j2\varphi_1} & & & & & \\ & & & e^{j3\varphi_1} & & & & \\ & & & & 1 & & & \\ & & & & & e^{j2\varphi_1} & & \\ & & & & & & e^{j3\varphi_1} & \\ & & & & & & & e^{j4\varphi_1} \end{bmatrix},$$

$$\begin{bmatrix} 1 & & & & & & & \\ & e^{j\varphi_2} & & & & & & \\ & & e^{j2\varphi_2} & & & & & \\ & & & e^{j3\varphi_2} & & & & \\ & & & & 1 & & & \\ & & & & & e^{j2\varphi_2} & & \\ & & & & & & e^{j3\varphi_2} & \\ & & & & & & & e^{j4\varphi_2} \end{bmatrix},$$

$$\begin{bmatrix} 1 & & & & & & & \\ & e^{j\varphi_3} & & & & & & \\ & & e^{j2\varphi_3} & & & & & \\ & & & e^{j3\varphi_3} & & & & \\ & & & & 1 & & & \\ & & & & & e^{j2\varphi_3} & & \\ & & & & & & e^{j3\varphi_3} & \\ & & & & & & & e^{j4\varphi_3} \end{bmatrix},$$

$$\begin{bmatrix} 1 & & & & & & & \\ & e^{j\varphi_4} & & & & & & \\ & & e^{j2\varphi_4} & & & & & \\ & & & e^{j3\varphi_4} & & & & \\ & & & & 1 & & & \\ & & & & & e^{j2\varphi_4} & & \\ & & & & & & e^{j3\varphi_4} & \\ & & & & & & & e^{j4\varphi_4} \end{bmatrix}$$

wherein: $\varphi_1 = \frac{-\pi}{32}, \varphi_2 = \frac{-3\pi}{32}, \varphi_3 = \frac{3\pi}{32}, \varphi_4 = \frac{\pi}{32}$.

In another example, the codebook C2 includes: any two code words in $$\begin{bmatrix} 1 & & & & & & & \\ & 1 & & & & & & \\ & & 1 & & & & & \\ & & & 1 & & & & \\ & & & & 1 & & & \\ & & & & & 1 & & \\ & & & & & & 1 & \\ & & & & & & & 1 \end{bmatrix}, \begin{bmatrix} 1 & & & & & & & \\ & 1 & & & & & & \\ & & 1 & & & & & \\ & & & 1 & & & & \\ & & & & j & & & \\ & & & & & j & & \\ & & & & & & j & \\ & & & & & & & j \end{bmatrix},$$

$$\begin{bmatrix} 1 & & & & & & & \\ & 1 & & & & & & \\ & & 1 & & & & & \\ & & & 1 & & & & \\ & & & & -1 & & & \\ & & & & & -1 & & \\ & & & & & & -1 & \\ & & & & & & & -1 \end{bmatrix}, \begin{bmatrix} 1 & & & & & & & \\ & 1 & & & & & & \\ & & 1 & & & & & \\ & & & 1 & & & & \\ & & & & -j & & & \\ & & & & & -j & & \\ & & & & & & -j & \\ & & & & & & & -j \end{bmatrix}$$

plus any group in the following 2 groups of code words:

first group:

$$\begin{bmatrix} 1 & & & & & & & \\ & e^{j\varphi_1} & & & & & & \\ & & e^{j2\varphi_1} & & & & & \\ & & & e^{j3\varphi_1} & & & & \\ & & & & 1 & & & \\ & & & & & e^{j2\varphi_1} & & \\ & & & & & & e^{j3\varphi_1} & \\ & & & & & & & e^{j4\varphi_1} \end{bmatrix},$$

$$\begin{bmatrix} 1 & & & & & & & \\ & e^{j\varphi_2} & & & & & & \\ & & e^{j2\varphi_2} & & & & & \\ & & & e^{j3\varphi_2} & & & & \\ & & & & 1 & & & \\ & & & & & e^{j2\varphi_2} & & \\ & & & & & & e^{j3\varphi_2} & \\ & & & & & & & e^{j4\varphi_2} \end{bmatrix}$$

wherein: $\varphi_1 = \frac{\pi}{16}, \varphi_2 = \frac{-\pi}{16}$;

second group:

$$\begin{bmatrix} 1 & & & \\ & e^{j\theta_1} & & \\ & & O & \\ & & & e^{j7\theta_1} \end{bmatrix}, \begin{bmatrix} 1 & & & \\ & e^{j\theta_2} & & \\ & & O & \\ & & & e^{j7\theta_2} \end{bmatrix}$$

wherein: $\theta_1 = \frac{3\pi}{32}, \theta_2 = \frac{-3\pi}{32}$.

A system for acquiring channel information provided by the example includes a base station and a User Equipment (UE), wherein:

the base station comprises:

a storage module, which is configured to: save a first codebook and a second codebook, wherein the first codebook is used for channel information quantization in various scenarios, code words in the first codebook can quantize channel information of 8 antennas independently, and code words in the second codebook are used for performing more precise quantization to the channel information based on the code words in the first codebook, wherein the second codebook is a second codebook used currently; and a channel information acquisition module, which is configured to: after obtaining Precoding Matrix Indicators (PMIs) fed back from the UE, find the corresponding code words from the first codebook and the second codebook used currently, and acquire the channel information;

the UE includes:

a storage module, which is configured to: save a first codebook and a second codebook identical with the first codebook and the second codebook of the base station; and a channel information feedback module, which is configured to: perform feedback of at least 2 PMIs to the base station, wherein, one PMI corresponds to one code word in the first codebook, every other PMI corresponds to one code word in the second codebook used currently (that is, all the other PMIs respectively correspond to different code words W2 in a codebook C2), and all the code words corresponding to the fed back PMIs are used for representing channel information of one or multiple subbands.

The specific codebooks may refer to the above descriptions.

The example also provides a base station, and the base station includes:

a storage module, which is configured to: save a first codebook and a second codebook, wherein the first codebook is used for channel information quantization in various scenarios, code words in the first codebook can quantize channel information of 8 antennas independently, and code words in the second codebook are used for performing more precise quantization to the channel information based on the code words in the first codebook, wherein the second codebook is a second codebook used currently;

a receiving module, which is configured to: receive at least 2 Precoding Matrix Indicators (PMIs) fed back from a User Equipment (UE) to the base station and send the PMIs to a channel information acquisition module, wherein, one PMI corresponds to one code word in the first codebook, which is identical with the first codebook stored by the base station, all the other PMIs respectively correspond to different code words in the second codebook currently used and stored by the UE, which are identical with the second codebook stored by the base station, and all the code words corresponding to the fed back PMIs are used for representing channel information of one or multiple subbands; and the channel information acquisition module, which is configured to: after obtaining the PMIs fed back from the UE, find the corresponding code words from the first codebook and the second codebook used currently, and acquire the channel information.

The specific codebooks may refer to the above descriptions.

Example 2

Figure 3:
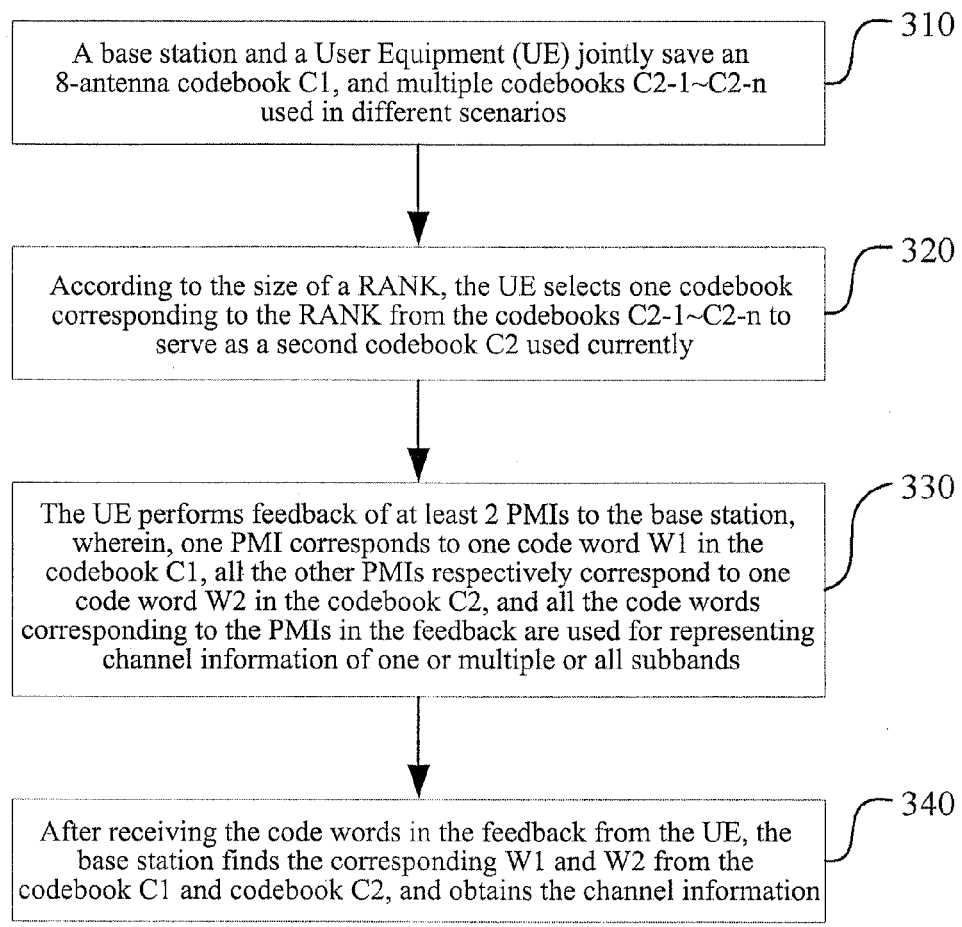
FIG. 3 is a flow diagram of the method according to the example 2 of the present document.

As shown in FIG. 3, the flow of the method in the example includes the following steps.

In step 310, a base station and a User Equipment (UE) jointly save an 8-antenna codebook C1, and multiple codebooks C2-1~C2-$n$ used in different scenarios.

The codebook C1 in the example is the same as the codebook C1 in the example 1. Code words in the codebooks C2-1~C2-$n$ are also used for performing more accurate quantization on the channel information based on code words in the codebook C1. Similarly, the codebook C1 also can be called as a first codebook, the codebooks C2-1~C2-$n$ also can be called as a second codebook, and a codebook C2 is used to represent a second codebook used currently in the example.

In step 320, the UE determines the size of a RANK according to the channel information, and selects one codebook corresponding to the RANK from the codebooks C2-1~C2-$n$ to serve as the second codebook C2 used currently.

In the example, the scenarios corresponding to the codebooks C2-1~C2-$n$ are related to the size of the RANK.

In one example, the base station and UE jointly save two codebooks, namely a codebook C2-1 and a codebook C2-2, used in different scenarios, and the UE can use different codebooks such as the codebook C2-1 and the codebook C2-2 with the same dimensionality according to different Ranks: when Rank=1, using the codebook C2-1, selecting an appropriate code word W2 from the codebook C2-1, and using the W2 and a W1 to unitedly represent the channel information; when Rank=2, using the codebook C2-2, selecting an appropriate code word W2 from the codebook C2-2, and using the W2 and a W1 to unitedly represent the channel information. For example, the codebook C2-1 can be a codebook appropriate for the feedback enhancement of single-polarized antennas, and the codebook C2-2 can be a codebook appropriate for the feedback enhancement of dual-polarized antennas. The reason is that the chief scenario in which the Rank1 appears is the single polarization and the chief scenario in which the Rank2 appears is the dual polarization.

In step 330, the step is the same as the step 220 in the example 1.

In step 340, the step is the same as the step 230 in the example 1.

In one example of the example, part or all of code words in the codebook C2-1 belong to the codebook in the following model:

$$\begin{bmatrix} 1 & & & & & & & \\ & 1 & & & & & & \\ & & 1 & & & & & \\ & & & 1 & & & & \\ & & & & 1 & & & \\ & & & & & 1 & & \\ & & & & & & 1 & \\ & & & & & & & 1 \end{bmatrix}, \begin{bmatrix} 1 & & & & & & & \\ & 1 & & & & & & \\ & & 1 & & & & & \\ & & & 1 & & & & \\ & & & & j & & & \\ & & & & & j & & \\ & & & & & & j & \\ & & & & & & & j \end{bmatrix}$$

$$\begin{bmatrix} 1 & & & & & & & \\ & 1 & & & & & & \\ & & 1 & & & & & \\ & & & 1 & & & & \\ & & & & -1 & & & \\ & & & & & -1 & & \\ & & & & & & -1 & \\ & & & & & & & -1 \end{bmatrix}, \begin{bmatrix} 1 & & & & & & & \\ & 1 & & & & & & \\ & & 1 & & & & & \\ & & & 1 & & & & \\ & & & & -j & & & \\ & & & & & -j & & \\ & & & & & & -j & \\ & & & & & & & -j \end{bmatrix}$$

part or all of code words in the codebook C2-2 belong to the codebook in the following model:

$$\begin{bmatrix} 1 & & & & & & & \\ & e^{j\varphi_1} & & & & & & \\ & & e^{j2\varphi_1} & & & & & \\ & & & e^{j3\varphi_1} & & & & \\ & & & & 1 & & & \\ & & & & & e^{j2\varphi_1} & & \\ & & & & & & e^{j3\varphi_1} & \\ & & & & & & & e^{j4\varphi_1} \end{bmatrix},$$

$$\begin{bmatrix} 1 & & & & & & & \\ & e^{j\varphi_2} & & & & & & \\ & & e^{j2\varphi_2} & & & & & \\ & & & e^{j3\varphi_2} & & & & \\ & & & & 1 & & & \\ & & & & & e^{j2\varphi_2} & & \\ & & & & & & e^{j3\varphi_2} & \\ & & & & & & & e^{j4\varphi_2} \end{bmatrix},$$

$$\begin{bmatrix} 1 & & & & & & & \\ & e^{j\varphi_3} & & & & & & \\ & & e^{j2\varphi_3} & & & & & \\ & & & e^{j3\varphi_3} & & & & \\ & & & & 1 & & & \\ & & & & & e^{j2\varphi_3} & & \\ & & & & & & e^{j3\varphi_3} & \\ & & & & & & & e^{j4\varphi_3} \end{bmatrix},$$

$$\begin{bmatrix} 1 & & & & & & & \\ & e^{j\varphi_4} & & & & & & \\ & & e^{j2\varphi_4} & & & & & \\ & & & e^{j3\varphi_4} & & & & \\ & & & & 1 & & & \\ & & & & & e^{j2\varphi_4} & & \\ & & & & & & e^{j3\varphi_4} & \\ & & & & & & & e^{j4\varphi_4} \end{bmatrix}$$

wherein: $\varphi_1 = \frac{-\pi}{32}, \varphi_2 = \frac{-3\pi}{32}, \varphi_3 = \frac{3\pi}{32}, \varphi_4 = \frac{\pi}{32}$.

In another example, part or all of code words in the codebook C2-1 belong to the codebook in the following model:

$$\begin{bmatrix} 1 & & \\ & e^{j\theta_1} & \\ & O & \\ & & e^{j7\theta_1} \end{bmatrix} \begin{bmatrix} 1 & & \\ & e^{j\theta_2} & \\ & O & \\ & & e^{j7\theta_2} \end{bmatrix} \begin{bmatrix} 1 & & \\ & e^{j\theta_3} & \\ & O & \\ & & e^{j7\theta_3} \end{bmatrix}$$

$$\begin{bmatrix} 1 & & \\ & e^{j\theta_4} & \\ & O & \\ & & e^{j7\theta_4} \end{bmatrix}$$

wherein: $\theta_1 = \frac{-\pi}{64}, \theta_2 = \frac{-3\pi}{64}, \theta_3 = \frac{3\pi}{64}, \theta_4 = \frac{\pi}{64}$;

the codebook C2-2 is a codebook including the following code words:

$$\begin{bmatrix} 1 & & & & & & & \\ & e^{j\varphi_1} & & & & & & \\ & & e^{j2\varphi_1} & & & & & \\ & & & e^{j3\varphi_1} & & & & \\ & & & & 1 & & & \\ & & & & & e^{j2\varphi_1} & & \\ & & & & & & e^{j3\varphi_1} & \\ & & & & & & & e^{j4\varphi_1} \end{bmatrix},$$

$$\begin{bmatrix} 1 & & & & & & & \\ & e^{j\varphi_2} & & & & & & \\ & & e^{j2\varphi_2} & & & & & \\ & & & e^{j3\varphi_2} & & & & \\ & & & & 1 & & & \\ & & & & & e^{j2\varphi_2} & & \\ & & & & & & e^{j3\varphi_2} & \\ & & & & & & & e^{j4\varphi_2} \end{bmatrix},$$

$$\begin{bmatrix} 1 & & & & & & & \\ & e^{j\varphi_3} & & & & & & \\ & & e^{j2\varphi_3} & & & & & \\ & & & e^{j3\varphi_3} & & & & \\ & & & & 1 & & & \\ & & & & & e^{j2\varphi_3} & & \\ & & & & & & e^{j3\varphi_3} & \\ & & & & & & & e^{j4\varphi_3} \end{bmatrix},$$

$$\begin{bmatrix} 1 \\ e^{j\varphi_4} \\ & e^{j2\varphi_4} \\ & & e^{j3\varphi_4} \\ & & & 1 \\ & & & & e^{j2\varphi_4} \\ & & & & & e^{j3\varphi_4} \\ & & & & & & e^{j4\varphi_4} \end{bmatrix}$$

wherein: $\varphi_1 = \frac{-\pi}{32}, \varphi_2 = \frac{-3\pi}{32}, \varphi_3 = \frac{3\pi}{32}, \varphi_4 = \frac{\pi}{32}$.

A system for acquiring channel information provided by the example includes a base station and a User Equipment (UE), wherein:

the base station comprises:

a storage module, which is configured to: save a first codebook and multiple second codebooks, wherein the first codebook is used for channel information quantization in various scenarios, code words in the first codebook can quantize channel information of 8 antennas independently, and code words in the second codebooks are used for performing more precise quantization to the channel information based on the code words in the first codebook; and a channel information acquisition module, which is configured to: after receiving Precoding Matrix Indicators (PMIs) fed back from the UE, find the corresponding code words from the first codebook and a second codebook used currently, and acquire the channel information;

the UE includes:

a storage module, which is configured to: save a first codebook and multiple second codebooks identical with the first codebook and multiple second codebooks of the base station;

a channel information feedback module, which is configured to: perform feedback of at least 2 PMIs to the base station, wherein, one PMI corresponds to one code word in the first codebook, every other PMI corresponds to one code word in the second codebook used currently (that is, all the other PMIs respectively correspond to different code words W2 in a codebook C2), and all the code words corresponding to the fed back PMIs are used for representing channel information of one or multiple subbands; and a judgment module, which is configured to: after judging the size of a rank according to the channel information, determine a second codebook corresponding to the rank as the second codebook used currently. In one example, when the storage module of the base station and the storage module of the UE jointly save a second codebook used for the feedback enhancement of single-polarized antennas and a second codebook used for the feedback enhancement of dual-polarized antennas, the judgment module is configured to determine the size of the rank according to the channel information, if the rank is 1, the second codebook used for the feedback enhancement of single-polarized antennas is determined as the second codebook used currently, and if the rank is 2, the second codebook used for the feedback enhancement of dual-polarized antennas is determined as the second codebook used currently.

Example 3

The example is basically identical with the example 2, a base station and a UE jointly save multiple codebooks C2-1~C2-n, n>1. The difference is: the base station carrying indication information that which codebook in the codebooks C2-1~C2-n is the codebook C2 used currently through a top layer signaling, for example, identification information of a codebook C2-j required to be used currently is carried, 1<=j<=n. The UE determines the codebook C2 required to be used according to the indication information. That is, the same codebook C2 is used with regard to both the Rank1 and Rank2 in the example.

A system for acquiring channel information provided by the example includes a base station and a User Equipment (UE), wherein:

the base station comprises:

a storage module, which is configured to: save a first codebook and multiple second codebooks, wherein, the first codebook is used for channel information quantization in various scenarios, code words in the first codebook can quantize channel information of 8 antennas independently, and code words in the second codebooks are used for performing more precise quantization to the channel information based on the code words in the first codebook; and a channel information acquisition module, which is configured to: after receiving Precoding Matrix Indicators (PMIs) fed back from the UE, find the corresponding code words from the first codebook and a second codebook used currently, and acquire the channel information;

the UE includes:

a storage module, which is configured to: save a first codebook and multiple second codebooks identical with the first codebook and multiple second codebooks of the base station;

a channel information feedback module, which is configured to: perform feedback of at least 2 PMIs to the base station, wherein, one PMI corresponds to one code word in the first codebook, all the other PMIs respectively correspond to different code words in a second codebook used currently, and all the code words corresponding to the fed back PMIs are used for representing channel information of one or multiple subbands; and a judgment module, which is configured to: determine the second codebook used currently according to the indication information carried in the signaling sent by the base station.

It is easily conceived that, in other examples, the base station and UE also can jointly save multiple first codebooks, and the UE determines a first codebook used currently according to the indication information in the top layer signaling sent by the base station or the RANK, at this point, the number of second codebooks can be one or multiple, if there are multiple second codebooks, the UE also can determine the second codebook used currently according to the top layer signaling sent by the base station or the RANK.

In addition, when the storage module of the base station and the storage module of the UE jointly save multiple second codebooks used in different scenarios, a selection module of the UE can select the second codebook used currently and inform the base station of the selected second codebook.

Example 4

The example relates to a multi-precision method for performing feedback of channel information, and the method includes:

a UE performing feedback of multiple Precoding Matrix Indicators (PMIs) to a base station, wherein, one PMI corresponds to one code word in a first codebook used currently, other PMIs respectively correspond to one code word in a second codebook used currently, and the code words corresponding to the fed back PMIs are used for representing channel information of one or multiple or all subbands.

The code words included in the second codebook used for the feedback enhancement of single-polarized antennas are the same as the code words in the second codebook described in the summary of the document, which can enhance the quantization precision.

Example 5

The example relates to a multi-precision method for performing feedback of channel information, and the method includes:

a base station and a UE jointly saving a second codebook used for feedback enhancement of single-polarized antennas and a second codebook used for feedback enhancement of dual-polarized antennas;

after judging the size of a rank according to the channel information, if the rank is 1, the UE using the second codebook used for the feedback enhancement of single-polarized antennas as a second codebook used currently, and if the rank is 2, the UE using the second codebook used for the feedback enhancement of dual-polarized antennas as a second codebook used currently.

The code words included in the second codebook used for the feedback enhancement of single-polarized antennas and the code words included in the second codebook used for the feedback enhancement of dual-polarized antennas are the same as the code words in the second codebook described in the summary of the document, which can enhance the quantization precision.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or multiple integrated circuits. Correspondingly, each module/unit in the above examples can be implemented in a form of hardware, and also can be implemented in a form of software function module. The present document is not limited to any combination of hardware and software in a specific form.

The above description is only the preferred examples of the present document, which is not used to limit the present document. The present document can have various modifications and changes for the skilled in the art. All the modifications, equivalent substitutions, and improvements, etc. made within the spirit and principle of the present document shall fall into the protection scope of the present document.

INDUSTRIAL APPLICABILITY

In the method for acquiring the channel information provided by the present document, multi-precision and multi-codebook joint feedback is used, which is appropriate for both dual-polarized channels and single-polarized channels, and the code words of the second codebook are specially set, which can enhance the quantization precision.

What is claimed is:

1. A method for acquiring channel information wherein the method is a multi-precision method for acquiring channel information, and the method comprises:

a base station and a User Equipment (UE) jointly saving a first codebook and at least one second codebook, and the first codebook being used for channel information quantization in various scenarios;

the UE performing feedback of at least two Precoding Matrix Indicators (PMIs) to the base station, wherein, one PMI corresponds to one code word in the first codebook, all the other PMIs respectively correspond to different code words in a second codebook used currently, and each code word which is fed back corresponding to the PMI is used for representing channel information of one or multiple or all subbands; and the base station finding corresponding code words from the first codebook and the second codebook used currently, and acquiring the channel information after receiving the PMIs fed back from the UE;

wherein one of the second codebooks jointly saved by the base station and the UE comprises the following 4 code words:

$$\begin{bmatrix} 1 & & & & & & & \\ & 1 & & & & & & \\ & & 1 & & & & & \\ & & & 1 & & & & \\ & & & & 1 & & & \\ & & & & & 1 & & \\ & & & & & & 1 & \\ & & & & & & & 1 \end{bmatrix}, \begin{bmatrix} 1 & & & & & & & \\ & 1 & & & & & & \\ & & 1 & & & & & \\ & & & 1 & & & & \\ & & & & j & & & \\ & & & & & j & & \\ & & & & & & j & \\ & & & & & & & j \end{bmatrix}$$

$$\begin{bmatrix} 1 & & & & & & & \\ & 1 & & & & & & \\ & & 1 & & & & & \\ & & & 1 & & & & \\ & & & & -1 & & & \\ & & & & & -1 & & \\ & & & & & & -1 & \\ & & & & & & & -1 \end{bmatrix}, \begin{bmatrix} 1 & & & & & & & \\ & 1 & & & & & & \\ & & 1 & & & & & \\ & & & 1 & & & & \\ & & & & -j & & & \\ & & & & & -j & & \\ & & & & & & -j & \\ & & & & & & & -j \end{bmatrix}$$

or one of the second codebooks jointly saved by the base station and the UE comprises the following 4 code words:

$$\begin{bmatrix} 1 & & & & & & & \\ & e^{j\frac{-\pi}{32}} & & & & & & \\ & & e^{j2\frac{-\pi}{32}} & & & & & \\ & & & e^{j3\frac{-\pi}{32}} & & & & \\ & & & & 1 & & & \\ & & & & & e^{j\frac{-\pi}{32}} & & \\ & & & & & & e^{j2\frac{-\pi}{32}} & \\ & & & & & & & e^{j3\frac{-\pi}{32}} \end{bmatrix},$$

$$\begin{bmatrix} 1 & & & & & & & \\ & e^{j\frac{-3\pi}{32}} & & & & & & \\ & & e^{j2\frac{-3\pi}{32}} & & & & & \\ & & & e^{j3\frac{-3\pi}{32}} & & & & \\ & & & & -1 & & & \\ & & & & & -e^{j\frac{-3\pi}{32}} & & \\ & & & & & & -e^{j2\frac{-3\pi}{32}} & \\ & & & & & & & -e^{j3\frac{-3\pi}{32}} \end{bmatrix}$$

$$\begin{bmatrix} 1 & & & & & & & \\ & e^{j\frac{\pi}{32}} & & & & & & \\ & & e^{j2\frac{\pi}{32}} & & & & & \\ & & & e^{j3\frac{\pi}{32}} & & & & \\ & & & & j & & & \\ & & & & & je^{j\frac{\pi}{32}} & & \\ & & & & & & je^{j2\frac{\pi}{32}} & \\ & & & & & & & je^{j3\frac{\pi}{32}} \end{bmatrix},$$

$$\begin{bmatrix} 1 & & & & & & & \\ & e^{j\frac{3\pi}{32}} & & & & & & \\ & & e^{j2\frac{3\pi}{32}} & & & & & \\ & & & e^{j3\frac{3\pi}{32}} & & & & \\ & & & & -j & & & \\ & & & & & -je^{j\frac{3\pi}{32}} & & \\ & & & & & & -je^{j2\frac{3\pi}{32}} & \\ & & & & & & & -je^{j3\frac{3\pi}{32}} \end{bmatrix}$$

or one of the second codebooks jointly saved by the base station and the UE comprises the following 8 code words:

$$\begin{bmatrix} 1 & & & & & & & \\ & 1 & & & & & & \\ & & 1 & & & & & \\ & & & 1 & & & & \\ & & & & 1 & & & \\ & & & & & 1 & & \\ & & & & & & 1 & \\ & & & & & & & 1 \end{bmatrix}, \begin{bmatrix} 1 & & & & & & & \\ & 1 & & & & & & \\ & & 1 & & & & & \\ & & & 1 & & & & \\ & & & & j & & & \\ & & & & & j & & \\ & & & & & & j & \\ & & & & & & & j \end{bmatrix}$$

$$\begin{bmatrix} 1 & & & & & & & \\ & 1 & & & & & & \\ & & 1 & & & & & \\ & & & 1 & & & & \\ & & & & -1 & & & \\ & & & & & -1 & & \\ & & & & & & -1 & \\ & & & & & & & -1 \end{bmatrix}, \begin{bmatrix} 1 & & & & & & & \\ & 1 & & & & & & \\ & & 1 & & & & & \\ & & & 1 & & & & \\ & & & & -j & & & \\ & & & & & -j & & \\ & & & & & & -j & \\ & & & & & & & -j \end{bmatrix}$$

$$\begin{bmatrix} 1 & & & & & & & \\ & e^{j\varphi_1} & & & & & & \\ & & e^{j2\varphi_1} & & & & & \\ & & & e^{j3\varphi_1} & & & & \\ & & & & 1 & & & \\ & & & & & e^{j2\varphi_1} & & \\ & & & & & & e^{j3\varphi_1} & \\ & & & & & & & e^{j4\varphi_1} \end{bmatrix},$$

$$\begin{bmatrix} 1 & & & & & & & \\ & e^{j\varphi_2} & & & & & & \\ & & e^{j2\varphi_2} & & & & & \\ & & & e^{j3\varphi_2} & & & & \\ & & & & 1 & & & \\ & & & & & e^{j2\varphi_2} & & \\ & & & & & & e^{j3\varphi_2} & \\ & & & & & & & e^{j4\varphi_2} \end{bmatrix}$$

$$\begin{bmatrix} 1 & & & & & & & \\ & e^{j\varphi_3} & & & & & & \\ & & e^{j2\varphi_3} & & & & & \\ & & & e^{j3\varphi_3} & & & & \\ & & & & 1 & & & \\ & & & & & e^{j2\varphi_3} & & \\ & & & & & & e^{j3\varphi_3} & \\ & & & & & & & e^{j4\varphi_3} \end{bmatrix},$$

$$\begin{bmatrix} 1 & & & & & & & \\ & e^{j\varphi_4} & & & & & & \\ & & e^{j2\varphi_4} & & & & & \\ & & & e^{j3\varphi_4} & & & & \\ & & & & 1 & & & \\ & & & & & e^{j2\varphi_4} & & \\ & & & & & & e^{j3\varphi_4} & \\ & & & & & & & e^{j4\varphi_4} \end{bmatrix}$$

wherein: $\varphi_1 = \frac{-\pi}{32}, \varphi_2 = \frac{-3\pi}{32}, \varphi_3 = \frac{3\pi}{32}, \varphi_4 = \frac{\pi}{32}$;

or one of the second codebooks jointly saved by the base station and the UE comprises: any two code words in $$\begin{bmatrix} 1 & & & & & & & \\ & 1 & & & & & & \\ & & 1 & & & & & \\ & & & 1 & & & & \\ & & & & 1 & & & \\ & & & & & 1 & & \\ & & & & & & 1 & \\ & & & & & & & 1 \end{bmatrix}, \begin{bmatrix} 1 & & & & & & & \\ & 1 & & & & & & \\ & & 1 & & & & & \\ & & & 1 & & & & \\ & & & & j & & & \\ & & & & & j & & \\ & & & & & & j & \\ & & & & & & & j \end{bmatrix}$$

$$\begin{bmatrix} 1 & & & & & & & \\ & 1 & & & & & & \\ & & 1 & & & & & \\ & & & 1 & & & & \\ & & & & -1 & & & \\ & & & & & -1 & & \\ & & & & & & -1 & \\ & & & & & & & -1 \end{bmatrix}, \begin{bmatrix} 1 & & & & & & & \\ & 1 & & & & & & \\ & & 1 & & & & & \\ & & & 1 & & & & \\ & & & & -j & & & \\ & & & & & -j & & \\ & & & & & & -j & \\ & & & & & & & -j \end{bmatrix}$$

plus any group in the following 2 groups of code words:

first group:

$$\begin{bmatrix} 1 & & & & & & & \\ e^{ja_1} & & & & & & & \\ & e^{j2a_1} & & & & & & \\ & & e^{j3a_1} & & & & & \\ & & & 1 & & & & \\ & & & & e^{j2a_1} & & & \\ & & & & & e^{j3a_1} & & \\ & & & & & & e^{j4a_1} \end{bmatrix},$$

$$\begin{bmatrix} 1 & & & & & & & \\ e^{ja_2} & & & & & & & \\ & e^{j2a_2} & & & & & & \\ & & e^{j3a_2} & & & & & \\ & & & 1 & & & & \\ & & & & e^{j2a_2} & & & \\ & & & & & e^{j3a_2} & & \\ & & & & & & e^{j4a_2} \end{bmatrix}$$

wherein: $a_1 = \frac{\pi}{16}, a_2 = \frac{-\pi}{16}$;

second group:

$$\begin{bmatrix} 1 & \\ e^{j\theta_1} & \\ & O \\ & e^{j7\theta_1} \end{bmatrix}, \begin{bmatrix} 1 & \\ e^{j\theta_2} & \\ & O \\ & e^{j7\theta_2} \end{bmatrix}$$

wherein: $\theta_1 = \frac{3\pi}{32}, \theta_2 = \frac{-3\pi}{32}$.

2. The method according to claim 1 wherein:

the base station and the UE jointly save a second codebook, and this second codebook is the second codebook used currently; or the base station and the UE jointly save multiple second codebooks used in different scenarios, the scenarios are relevant to a size of a rank, and after judging the size of the rank according to channel information, the UE determines a second codebook corresponding to the rank as the second codebook used currently; or the base station and the UE jointly save multiple second codebooks used in different scenarios, and the UE determines the second codebook used currently according to indication information carried in a signaling sent by the base station; or the base station and the UE jointly save multiple second codebooks used in different scenarios, and the UE selects the second codebook used currently and informs the base station.

3. The method according to claim 1 wherein:

the base station and the UE jointly save two second codebooks used in different scenarios;

after judging the size of the rank according to the channel information, if the rank is 1, the UE determines one second codebook corresponding to the rank as the second codebook used currently, and if the rank is 2, the UE determines the other second codebook corresponding to the rank as the second codebook used currently.

4. The method according to claim 1 wherein, in the step of the UE performing feedback of the PMIs to the base station, the PMIs fed back are one of following situations:

a number of the PMIs fed back is S+1, corresponding code words are one code word in the first codebook and S code words in the second codebook used currently, S pairs of code words obtained by combining the code word in the first codebook and each code word in the S code words are used for representing channel information of S subbands respectively, and S is an integer greater than 1; or a number of the PMIs in the feedback is 2, and corresponding code words are one code word in the first codebook and one code word in the second codebook used currently, which are used for representing channel information of one subband; or a number of the PMIs in the feedback is 2, and corresponding code words are one code word in the first codebook and one code word in the second codebook used currently, which are used for representing channel information of one wideband.

5. The method according to claim 1 wherein code words in the first codebook can quantize channel information of 8 antennas independently, and code words in the second codebook are used for performing more precise quantization to the channel information based on the code words in the first codebook.

6. The method according to claim 3 wherein, one of the two second codebooks comprises the following code words:

$$\begin{bmatrix} 1 & & & & & & & \\ & 1 & & & & & & \\ & & 1 & & & & & \\ & & & 1 & & & & \\ & & & & 1 & & & \\ & & & & & 1 & & \\ & & & & & & 1 & \\ & & & & & & & 1 \end{bmatrix}, \begin{bmatrix} 1 & & & & & & & \\ & 1 & & & & & & \\ & & 1 & & & & & \\ & & & 1 & & & & \\ & & & & j & & & \\ & & & & & j & & \\ & & & & & & j & \\ & & & & & & & j \end{bmatrix}$$

$$\begin{bmatrix} 1 & & & & & & & \\ & 1 & & & & & & \\ & & 1 & & & & & \\ & & & 1 & & & & \\ & & & & -1 & & & \\ & & & & & -1 & & \\ & & & & & & -1 & \\ & & & & & & & -1 \end{bmatrix}, \begin{bmatrix} 1 & & & & & & & \\ & 1 & & & & & & \\ & & 1 & & & & & \\ & & & 1 & & & & \\ & & & & -j & & & \\ & & & & & -j & & \\ & & & & & & -j & \\ & & & & & & & -j \end{bmatrix}$$

the other second codebook comprises the following code words:

$$\begin{bmatrix} 1 & & & & & & & \\ & e^{j\varphi_1} & & & & & & \\ & & e^{j2\varphi_1} & & & & & \\ & & & e^{j3\varphi_1} & & & & \\ & & & & 1 & & & \\ & & & & & e^{j2\varphi_1} & & \\ & & & & & & e^{j3\varphi_1} & \\ & & & & & & & e^{j4\varphi_1} \end{bmatrix},$$

$$\begin{bmatrix} 1 & & & & & & & \\ & e^{j\varphi_2} & & & & & & \\ & & e^{j2\varphi_2} & & & & & \\ & & & e^{j3\varphi_2} & & & & \\ & & & & 1 & & & \\ & & & & & e^{j2\varphi_2} & & \\ & & & & & & e^{j3\varphi_2} & \\ & & & & & & & e^{j4\varphi_2} \end{bmatrix},$$

$$\begin{bmatrix} 1 & & & & & & & \\ & e^{j\varphi_3} & & & & & & \\ & & e^{j2\varphi_3} & & & & & \\ & & & e^{j3\varphi_3} & & & & \\ & & & & 1 & & & \\ & & & & & e^{j2\varphi_3} & & \\ & & & & & & e^{j3\varphi_3} & \\ & & & & & & & e^{j4\varphi_3} \end{bmatrix},$$

$$\begin{bmatrix} 1 & & & & & & & \\ & e^{j\varphi_4} & & & & & & \\ & & e^{j2\varphi_4} & & & & & \\ & & & e^{j3\varphi_4} & & & & \\ & & & & 1 & & & \\ & & & & & e^{j2\varphi_4} & & \\ & & & & & & e^{j3\varphi_4} & \\ & & & & & & & e^{j4\varphi_4} \end{bmatrix}$$

wherein: $\varphi_1 = \dfrac{-\pi}{32}, \varphi_2 = \dfrac{-3\pi}{32}, \varphi_3 = \dfrac{3\pi}{32}, \varphi_4 = \dfrac{\pi}{32}$;

or one of the two second codebooks comprises the following code words:

$$\begin{bmatrix} 1 & & \\ e^{j\theta_1} & & \\ & O & \\ & & e^{j7\theta_1} \end{bmatrix} \begin{bmatrix} 1 & & \\ e^{j\theta_2} & & \\ & O & \\ & & e^{j7\theta_2} \end{bmatrix} \begin{bmatrix} 1 & & \\ e^{j\theta_3} & & \\ & O & \\ & & e^{j7\theta_3} \end{bmatrix}$$

$$\begin{bmatrix} 1 & & \\ e^{j\theta_4} & & \\ & O & \\ & & e^{j7\theta_4} \end{bmatrix}$$

wherein: $\theta_1 = \dfrac{-\pi}{64}, \theta_2 = \dfrac{-3\pi}{64}, \theta_3 = \dfrac{3\pi}{64}, \theta_4 = \dfrac{\pi}{64}$;

the other second codebook comprises the following code words:

$$\begin{bmatrix} 1 & & & & & & & \\ & e^{ja_1} & & & & & & \\ & & e^{j2a_1} & & & & & \\ & & & e^{j3a_1} & & & & \\ & & & & 1 & & & \\ & & & & & e^{j2a_1} & & \\ & & & & & & e^{j3a_1} & \\ & & & & & & & e^{j4a_1} \end{bmatrix},$$

$$\begin{bmatrix} 1 & & & & & & & \\ & e^{ja_2} & & & & & & \\ & & e^{j2a_2} & & & & & \\ & & & e^{j3a_2} & & & & \\ & & & & 1 & & & \\ & & & & & e^{j2a_2} & & \\ & & & & & & e^{j3a_2} & \\ & & & & & & & e^{j4a_2} \end{bmatrix}$$

$$\begin{bmatrix} 1 & & & & & & & \\ & e^{ja_3} & & & & & & \\ & & e^{j2a_3} & & & & & \\ & & & e^{j3a_3} & & & & \\ & & & & 1 & & & \\ & & & & & e^{j2a_3} & & \\ & & & & & & e^{j3a_3} & \\ & & & & & & & e^{j4a_3} \end{bmatrix},$$

$$\begin{bmatrix} 1 & & & & & & & \\ & e^{j\varphi_4} & & & & & & \\ & & e^{j2\varphi_4} & & & & & \\ & & & e^{j3\varphi_4} & & & & \\ & & & & 1 & & & \\ & & & & & e^{j2\varphi_4} & & \\ & & & & & & e^{j3\varphi_4} & \\ & & & & & & & e^{j4\varphi_4} \end{bmatrix}$$

wherein: $a_1 = \frac{-\pi}{32}, a_2 = \frac{-3\pi}{32}, a_3 = \frac{3\pi}{32}, a_4 = \frac{\pi}{32}$.

7. A system for acquiring channel information wherein the system is a multi-precision system for acquiring channel information, and the system comprises a base station and a User Equipment (UE), wherein:

the base station comprises at least one processor executing a storage module and a channel information acquisition module wherein:

the storage module is configured to: save a first codebook and at least one second codebook, wherein the first codebook is used for channel information quantization in various scenarios; and the channel information acquisition module is configured to: find corresponding code words from the first codebook and a second codebook used currently, and acquire the channel information after receiving Precoding Matrix Indicators (PMIs) fed back from the UE;

the UE comprises at least one processor executing a storage unit and a channel information feedback unit wherein:

the storage unit is configured to: save a first codebook and at least one second codebook identical with the first codebook and the second codebook of the base station; and the channel information feedback module is configured to perform feedback of at least two PMIs to the base station, wherein one PMI corresponds to one code word in the first codebook, all the other PMIs respectively correspond to different code words in a second codebook used currently, and each code word which is fed back corresponding to the PMIs is used for representing channel information of one or multiple subbands;

wherein one of the second codebooks jointly saved by the base station and the UE comprises the following 4 code words:

$$\begin{bmatrix} 1 & & & & & & & \\ & 1 & & & & & & \\ & & 1 & & & & & \\ & & & 1 & & & & \\ & & & & 1 & & & \\ & & & & & 1 & & \\ & & & & & & 1 & \\ & & & & & & & 1 \end{bmatrix}, \begin{bmatrix} 1 & & & & & & & \\ & 1 & & & & & & \\ & & 1 & & & & & \\ & & & 1 & & & & \\ & & & & j & & & \\ & & & & & j & & \\ & & & & & & j & \\ & & & & & & & j \end{bmatrix}$$

$$\begin{bmatrix} 1 & & & & & & & \\ & 1 & & & & & & \\ & & 1 & & & & & \\ & & & 1 & & & & \\ & & & & -1 & & & \\ & & & & & -1 & & \\ & & & & & & -1 & \\ & & & & & & & -1 \end{bmatrix}, \begin{bmatrix} 1 & & & & & & & \\ & 1 & & & & & & \\ & & 1 & & & & & \\ & & & 1 & & & & \\ & & & & -j & & & \\ & & & & & -j & & \\ & & & & & & -j & \\ & & & & & & & -j \end{bmatrix}$$

or one of the second codebooks jointly saved by the base station and the UE comprises the following 4 code words:

$$\begin{bmatrix} 1 & & & & & & & \\ & e^{j\frac{-\pi}{32}} & & & & & & \\ & & e^{j2\frac{-\pi}{32}} & & & & & \\ & & & e^{j3\frac{-\pi}{32}} & & & & \\ & & & & 1 & & & \\ & & & & & e^{j\frac{-\pi}{32}} & & \\ & & & & & & e^{j2\frac{-\pi}{32}} & \\ & & & & & & & e^{j3\frac{-\pi}{32}} \end{bmatrix},$$

$$\begin{bmatrix} 1 & & & & & & & \\ & e^{j\frac{-3\pi}{32}} & & & & & & \\ & & e^{j2\frac{-3\pi}{32}} & & & & & \\ & & & e^{j3\frac{-3\pi}{32}} & & & & \\ & & & & -1 & & & \\ & & & & & -e^{j\frac{-3\pi}{32}} & & \\ & & & & & & -e^{j2\frac{-3\pi}{32}} & \\ & & & & & & & -e^{j3\frac{-3\pi}{32}} \end{bmatrix}$$

$$\begin{bmatrix} 1 & & & & & & & \\ & e^{j\frac{\pi}{32}} & & & & & & \\ & & e^{j2\frac{\pi}{32}} & & & & & \\ & & & e^{j3\frac{\pi}{32}} & & & & \\ & & & & j & & & \\ & & & & & je^{j\frac{\pi}{32}} & & \\ & & & & & & je^{j2\frac{\pi}{32}} & \\ & & & & & & & je^{j3\frac{\pi}{32}} \end{bmatrix},$$

$$\begin{bmatrix} 1 & & & & & & & \\ & e^{j\frac{3\pi}{32}} & & & & & & \\ & & e^{j2\frac{3\pi}{32}} & & & & & \\ & & & e^{j3\frac{3\pi}{32}} & & & & \\ & & & & -j & & & \\ & & & & & -je^{j\frac{3\pi}{32}} & & \\ & & & & & & -je^{j2\frac{3\pi}{32}} & \\ & & & & & & & -je^{j3\frac{3\pi}{32}} \end{bmatrix}$$

or one of the second codebooks jointly saved by the base station and the UE comprises the following 8 code words:

$$\begin{bmatrix} 1 & & & & & & & \\ & 1 & & & & & & \\ & & 1 & & & & & \\ & & & 1 & & & & \\ & & & & 1 & & & \\ & & & & & 1 & & \\ & & & & & & 1 & \\ & & & & & & & 1 \end{bmatrix}, \begin{bmatrix} 1 & & & & & & & \\ & 1 & & & & & & \\ & & 1 & & & & & \\ & & & 1 & & & & \\ & & & & j & & & \\ & & & & & j & & \\ & & & & & & j & \\ & & & & & & & j \end{bmatrix}$$

$$\begin{bmatrix} 1 & & & & & & & \\ & 1 & & & & & & \\ & & 1 & & & & & \\ & & & 1 & & & & \\ & & & & -1 & & & \\ & & & & & -1 & & \\ & & & & & & -1 & \\ & & & & & & & -1 \end{bmatrix}, \begin{bmatrix} 1 & & & & & & & \\ & 1 & & & & & & \\ & & 1 & & & & & \\ & & & 1 & & & & \\ & & & & -j & & & \\ & & & & & -j & & \\ & & & & & & -j & \\ & & & & & & & -j \end{bmatrix}$$

$$\begin{bmatrix} 1 & & & & & & & \\ & e^{j\varphi_1} & & & & & & \\ & & e^{j2\varphi_1} & & & & & \\ & & & e^{j3\varphi_1} & & & & \\ & & & & 1 & & & \\ & & & & & e^{j2\varphi_1} & & \\ & & & & & & e^{j3\varphi_1} & \\ & & & & & & & e^{j4\varphi_1} \end{bmatrix},$$

$$\begin{bmatrix} 1 & & & & & & & \\ & e^{j\varphi_2} & & & & & & \\ & & e^{j2\varphi_2} & & & & & \\ & & & e^{j3\varphi_2} & & & & \\ & & & & 1 & & & \\ & & & & & e^{j2\varphi_2} & & \\ & & & & & & e^{j3\varphi_2} & \\ & & & & & & & e^{j4\varphi_2} \end{bmatrix},$$

$$\begin{bmatrix} 1 & & & & & & & \\ & e^{j\varphi_3} & & & & & & \\ & & e^{j2\varphi_3} & & & & & \\ & & & e^{j3\varphi_3} & & & & \\ & & & & 1 & & & \\ & & & & & e^{j2\varphi_3} & & \\ & & & & & & e^{j3\varphi_3} & \\ & & & & & & & e^{j4\varphi_3} \end{bmatrix},$$

$$\begin{bmatrix} 1 & & & & & & & \\ & e^{j\varphi_4} & & & & & & \\ & & e^{j2\varphi_4} & & & & & \\ & & & e^{j3\varphi_4} & & & & \\ & & & & 1 & & & \\ & & & & & e^{j2\varphi_4} & & \\ & & & & & & e^{j3\varphi_4} & \\ & & & & & & & e^{j4\varphi_4} \end{bmatrix}$$

wherein: $\varphi_1 = \frac{-\pi}{32}, \varphi_2 = \frac{-3\pi}{32}, \varphi_3 = \frac{3\pi}{32}, \varphi_4 = \frac{\pi}{32}$;

or one of the second codebooks jointly saved by the base station and the UE comprises: any two code words in $$\begin{bmatrix} 1 & & & & & & & \\ & 1 & & & & & & \\ & & 1 & & & & & \\ & & & 1 & & & & \\ & & & & 1 & & & \\ & & & & & 1 & & \\ & & & & & & 1 & \\ & & & & & & & 1 \end{bmatrix}, \begin{bmatrix} 1 & & & & & & & \\ & 1 & & & & & & \\ & & 1 & & & & & \\ & & & 1 & & & & \\ & & & & j & & & \\ & & & & & j & & \\ & & & & & & j & \\ & & & & & & & j \end{bmatrix}$$

$$\begin{bmatrix} 1 & & & & & & & \\ & 1 & & & & & & \\ & & 1 & & & & & \\ & & & 1 & & & & \\ & & & & -1 & & & \\ & & & & & -1 & & \\ & & & & & & -1 & \\ & & & & & & & -1 \end{bmatrix}, \begin{bmatrix} 1 & & & & & & & \\ & 1 & & & & & & \\ & & 1 & & & & & \\ & & & 1 & & & & \\ & & & & -j & & & \\ & & & & & -j & & \\ & & & & & & -j & \\ & & & & & & & -j \end{bmatrix}$$

plus any group in the following 2 groups of code words:
first group:

$$\begin{bmatrix} 1 & & & & & & & \\ & e^{ja_1} & & & & & & \\ & & e^{j2a_1} & & & & & \\ & & & e^{j3a_1} & & & & \\ & & & & 1 & & & \\ & & & & & e^{j2a_1} & & \\ & & & & & & e^{j3a_1} & \\ & & & & & & & e^{j4a_1} \end{bmatrix},$$

$$\begin{bmatrix} 1 & & & & & & & \\ & e^{ja_2} & & & & & & \\ & & e^{j2a_2} & & & & & \\ & & & e^{j3a_2} & & & & \\ & & & & 1 & & & \\ & & & & & e^{j2a_2} & & \\ & & & & & & e^{j3a_2} & \\ & & & & & & & e^{j4a_2} \end{bmatrix}$$

wherein: $a_1 = \frac{\pi}{16}, a_2 = \frac{-\pi}{16};$ second group:

$$\begin{bmatrix} 1 & & & \\ & e^{j\theta_1} & & \\ & & O & \\ & & & e^{j7\theta_1} \end{bmatrix}, \begin{bmatrix} 1 & & & \\ & e^{j\theta_2} & & \\ & & O & \\ & & & e^{j7\theta_2} \end{bmatrix}$$

wherein: $\theta_1 = \frac{3\pi}{32}, \theta_2 = \frac{-3\pi}{32}.$

8. The system according to claim 7 wherein:
the storage module of the base station and the storage unit of the UE jointly save a second codebook, and this second codebook is the second codebook used currently; or
the storage module of the base station and the storage unit of the UE jointly save multiple second codebooks used in different scenarios, the scenarios are relevant to a size of a rank, the UE determine a second codebook corresponding to the rank as the second codebook used currently after judging the size of the rank according to channel information; or
the storage module of the base station and the storage unit of the UE jointly save multiple second codebooks used in different scenarios, the UE determines the second codebook used currently according to indication information carried in a signaling sent by the base station; or
the storage module of the base station and the storage unit of the UE jointly save multiple second codebooks used in different scenarios, the UE selects the second codebook used currently and inform the base station.

9. A base station comprising at least one processor executing a storage module, a receiving module and a channel information acquisition module wherein:

the storage module is configured to: save a first codebook and at least one second codebook;

the receiving module is configured to: receive at least two Precoding Matrix Indicators (PMIs) fed back from a User Equipment (UE) to the base station and send the PMIs to the channel information acquisition module, wherein, one PMI corresponds to one code word in the first codebook, which is identical with the first codebook stored by the base station, stored by the UE, all the other PMIs respectively correspond to different code words in the second codebook used currently, which are identical with the second codebook stored by the base station, stored by the UE, and each code word corresponding to the fed back PMIs is used for representing channel information of one or multiple subbands; and the channel information acquisition module is configured to: find corresponding code words from the first codebook and the second codebook used currently, and acquire the channel information after obtaining the PMIs in the feedback from the UE;

wherein one of the second codebooks jointly saved by the base station and the UE comprises the following 4 code words:

$$\begin{bmatrix} 1 & & & & & & & \\ & 1 & & & & & & \\ & & 1 & & & & & \\ & & & 1 & & & & \\ & & & & 1 & & & \\ & & & & & 1 & & \\ & & & & & & 1 & \\ & & & & & & & 1 \end{bmatrix}, \begin{bmatrix} 1 & & & & & & & \\ & 1 & & & & & & \\ & & 1 & & & & & \\ & & & 1 & & & & \\ & & & & j & & & \\ & & & & & j & & \\ & & & & & & j & \\ & & & & & & & j \end{bmatrix}$$

$$\begin{bmatrix} 1 & & & & & & & \\ & 1 & & & & & & \\ & & 1 & & & & & \\ & & & 1 & & & & \\ & & & & -1 & & & \\ & & & & & -1 & & \\ & & & & & & -1 & \\ & & & & & & & -1 \end{bmatrix}, \begin{bmatrix} 1 & & & & & & & \\ & 1 & & & & & & \\ & & 1 & & & & & \\ & & & 1 & & & & \\ & & & & -j & & & \\ & & & & & -j & & \\ & & & & & & -j & \\ & & & & & & & -j \end{bmatrix}$$

or one of the second codebooks jointly saved by the base station and the UE comprises the following 4 code words:

$$\begin{bmatrix} 1 & & & & & & & \\ & e^{j\frac{-\pi}{32}} & & & & & & \\ & & e^{j2\frac{-\pi}{32}} & & & & & \\ & & & e^{j3\frac{-\pi}{32}} & & & & \\ & & & & 1 & & & \\ & & & & & e^{j\frac{-\pi}{32}} & & \\ & & & & & & e^{j2\frac{-\pi}{32}} & \\ & & & & & & & e^{j3\frac{-\pi}{32}} \end{bmatrix},$$

$$\begin{bmatrix} 1 & & & & & & & \\ & e^{j\frac{-3\pi}{32}} & & & & & & \\ & & e^{j2\frac{-3\pi}{32}} & & & & & \\ & & & e^{j3\frac{-3\pi}{32}} & & & & \\ & & & & -1 & & & \\ & & & & & -e^{j\frac{-3\pi}{32}} & & \\ & & & & & & -e^{j2\frac{-3\pi}{32}} & \\ & & & & & & & -e^{j3\frac{-3\pi}{32}} \end{bmatrix}$$

$$\begin{bmatrix} 1 & & & & & & & \\ & e^{j\frac{\pi}{32}} & & & & & & \\ & & e^{j2\frac{\pi}{32}} & & & & & \\ & & & e^{j3\frac{\pi}{32}} & & & & \\ & & & & j & & & \\ & & & & & je^{j\frac{\pi}{32}} & & \\ & & & & & & je^{j2\frac{\pi}{32}} & \\ & & & & & & & je^{j3\frac{\pi}{32}} \end{bmatrix},$$

$$\begin{bmatrix} 1 & & & & & & & \\ & e^{j\frac{3\pi}{32}} & & & & & & \\ & & e^{j2\frac{3\pi}{32}} & & & & & \\ & & & e^{j3\frac{3\pi}{32}} & & & & \\ & & & & -j & & & \\ & & & & & -je^{j\frac{3\pi}{32}} & & \\ & & & & & & -je^{j2\frac{3\pi}{32}} & \\ & & & & & & & -je^{j3\frac{3\pi}{32}} \end{bmatrix}$$

or one of the second codebooks jointly saved by the base station and the UE comprises the following 8 code words:

$$\begin{bmatrix} 1 & & & & & & & \\ & e^{j\varphi_1} & & & & & & \\ & & e^{j2\varphi_1} & & & & & \\ & & & e^{j3\varphi_1} & & & & \\ & & & & 1 & & & \\ & & & & & e^{j2\varphi_1} & & \\ & & & & & & e^{j3\varphi_1} & \\ & & & & & & & e^{j4\varphi_1} \end{bmatrix},$$

$$\begin{bmatrix} 1 & & & & & & & \\ & e^{j\varphi_2} & & & & & & \\ & & e^{j2\varphi_2} & & & & & \\ & & & e^{j3\varphi_2} & & & & \\ & & & & 1 & & & \\ & & & & & e^{j2\varphi_2} & & \\ & & & & & & e^{j3\varphi_2} & \\ & & & & & & & e^{j4\varphi_2} \end{bmatrix}$$

$$\begin{bmatrix} 1 & & & & & & & \\ & e^{j\varphi_3} & & & & & & \\ & & e^{j2\varphi_3} & & & & & \\ & & & e^{j3\varphi_3} & & & & \\ & & & & 1 & & & \\ & & & & & e^{j2\varphi_3} & & \\ & & & & & & e^{j3\varphi_3} & \\ & & & & & & & e^{j4\varphi_3} \end{bmatrix},$$

$$\begin{bmatrix} 1 & & & & & & & \\ & e^{j\varphi_4} & & & & & & \\ & & e^{j2\varphi_4} & & & & & \\ & & & e^{j3\varphi_4} & & & & \\ & & & & 1 & & & \\ & & & & & e^{j2\varphi_4} & & \\ & & & & & & e^{j3\varphi_4} & \\ & & & & & & & e^{j4\varphi_4} \end{bmatrix}$$

wherein $\varphi_1 = \frac{-\pi}{32}, \varphi_2 = \frac{-3\pi}{32}, \varphi_3 = \frac{3\pi}{32}, \varphi_4 = \frac{\pi}{32}$;

or one of the second codebooks jointly saved by the base station and the UE comprises: any two code words in $$\begin{bmatrix} 1 & & & & & & & \\ & 1 & & & & & & \\ & & 1 & & & & & \\ & & & 1 & & & & \\ & & & & 1 & & & \\ & & & & & 1 & & \\ & & & & & & 1 & \\ & & & & & & & 1 \end{bmatrix},$$

$$\begin{bmatrix} 1 & & & & & & & \\ & 1 & & & & & & \\ & & 1 & & & & & \\ & & & 1 & & & & \\ & & & & j & & & \\ & & & & & j & & \\ & & & & & & j & \\ & & & & & & & j \end{bmatrix}$$

-continued $$\begin{bmatrix} 1 & & & & & & & \\ & 1 & & & & & & \\ & & 1 & & & & & \\ & & & 1 & & & & \\ & & & & -1 & & & \\ & & & & & -1 & & \\ & & & & & & -1 & \\ & & & & & & & -1 \end{bmatrix},$$

$$\begin{bmatrix} 1 & & & & & & & \\ & 1 & & & & & & \\ & & 1 & & & & & \\ & & & 1 & & & & \\ & & & & -j & & & \\ & & & & & -j & & \\ & & & & & & -j & \\ & & & & & & & -j \end{bmatrix}$$

plus any group in the following 2 groups of code words:
first group:

$$\begin{bmatrix} 1 & & & & & & & \\ & e^{ja_1} & & & & & & \\ & & e^{j2a_1} & & & & & \\ & & & e^{j3a_1} & & & & \\ & & & & 1 & & & \\ & & & & & e^{j2a_1} & & \\ & & & & & & e^{j3a_1} & \\ & & & & & & & e^{j4a_1} \end{bmatrix},$$

$$\begin{bmatrix} 1 & & & & & & & \\ & e^{ja_2} & & & & & & \\ & & e^{j2a_2} & & & & & \\ & & & e^{j3a_2} & & & & \\ & & & & 1 & & & \\ & & & & & e^{j2a_2} & & \\ & & & & & & e^{j3a_2} & \\ & & & & & & & e^{j4a_2} \end{bmatrix}$$

wherein $a_1 = \frac{\pi}{16}$, $a_2 = \frac{-\pi}{16}$;

second group $$\begin{bmatrix} 1 & & & \\ & e^{j\theta_1} & & \\ & & 0 & \\ & & & e^{j7\theta_1} \end{bmatrix}, \begin{bmatrix} 1 & & & \\ & e^{j\theta_2} & & \\ & & 0 & \\ & & & e^{j7\theta_2} \end{bmatrix}$$

wherein $\theta_1 = \frac{3\pi}{32}$, $\theta_2 = \frac{-3\pi}{32}$.

10. A method for performing feedback of channel information wherein the method is a multi-precision method for performing feedback of channel information, and the method comprises:

a UE feeding back multiple Precoding Matrix Indicators (PMIs) to a base station wherein one PMI corresponds to one code word in a first codebook used currently, other PMIs respectively correspond to one code word in a second codebook used currently, and the code words corresponding to the fed back PMIs are used for representing channel information of one or multiple or all subbands;

the second codebook comprises the following code words:

$$\begin{bmatrix} 1 & & & & & & & \\ & 1 & & & & & & \\ & & 1 & & & & & \\ & & & 1 & & & & \\ & & & & 1 & & & \\ & & & & & 1 & & \\ & & & & & & 1 & \\ & & & & & & & 1 \end{bmatrix}, \begin{bmatrix} 1 & & & & & & & \\ & 1 & & & & & & \\ & & 1 & & & & & \\ & & & 1 & & & & \\ & & & & j & & & \\ & & & & & j & & \\ & & & & & & j & \\ & & & & & & & j \end{bmatrix}$$

$$\begin{bmatrix} 1 & & & & & & & \\ & 1 & & & & & & \\ & & 1 & & & & & \\ & & & 1 & & & & \\ & & & & -1 & & & \\ & & & & & -1 & & \\ & & & & & & -1 & \\ & & & & & & & -1 \end{bmatrix}, \begin{bmatrix} 1 & & & & & & & \\ & 1 & & & & & & \\ & & 1 & & & & & \\ & & & 1 & & & & \\ & & & & -j & & & \\ & & & & & -j & & \\ & & & & & & -j & \\ & & & & & & & -j \end{bmatrix}$$

or the second codebook comprises the following 4 code words:

$$\begin{bmatrix} 1 & & & & & & & \\ & e^{j\frac{-\pi}{32}} & & & & & & \\ & & e^{j2\frac{-\pi}{32}} & & & & & \\ & & & e^{j3\frac{-\pi}{32}} & & & & \\ & & & & 1 & & & \\ & & & & & e^{j\frac{-\pi}{32}} & & \\ & & & & & & e^{j2\frac{-\pi}{32}} & \\ & & & & & & & e^{j3\frac{-\pi}{32}} \end{bmatrix},$$

$$\begin{bmatrix} 1 & & & & & & & \\ & e^{j\frac{-3\pi}{32}} & & & & & & \\ & & e^{j2\frac{-3\pi}{32}} & & & & & \\ & & & e^{j3\frac{-3\pi}{32}} & & & & \\ & & & & -1 & & & \\ & & & & & e^{j\frac{-3\pi}{32}} & & \\ & & & & & & e^{j2\frac{-3\pi}{32}} & \\ & & & & & & & e^{j3\frac{-3\pi}{32}} \end{bmatrix}$$

$$\begin{bmatrix} 1 & & & & & & & \\ & e^{j\frac{\pi}{32}} & & & & & & \\ & & e^{j2\frac{\pi}{32}} & & & & & \\ & & & e^{j3\frac{\pi}{32}} & & & & \\ & & & & j & & & \\ & & & & & je^{j\frac{\pi}{32}} & & \\ & & & & & & je^{j2\frac{\pi}{32}} & \\ & & & & & & & je^{j3\frac{\pi}{32}} \end{bmatrix},$$

$$\begin{bmatrix} 1 & & & & & & & \\ & e^{j\frac{3\pi}{32}} & & & & & & \\ & & e^{j2\frac{3\pi}{32}} & & & & & \\ & & & e^{j3\frac{3\pi}{32}} & & & & \\ & & & & -j & & & \\ & & & & & -je^{j\frac{3\pi}{32}} & & \\ & & & & & & -je^{j2\frac{3\pi}{32}} & \\ & & & & & & & -je^{j3\frac{3\pi}{32}} \end{bmatrix}$$

or the second codebook comprises the following 8 code words:

$$\begin{bmatrix} 1 & & & & & & & \\ & 1 & & & & & & \\ & & 1 & & & & & \\ & & & 1 & & & & \\ & & & & 1 & & & \\ & & & & & 1 & & \\ & & & & & & 1 & \\ & & & & & & & 1 \end{bmatrix},$$

$$\begin{bmatrix} 1 & & & & & & & \\ & 1 & & & & & & \\ & & 1 & & & & & \\ & & & 1 & & & & \\ & & & & j & & & \\ & & & & & j & & \\ & & & & & & j & \\ & & & & & & & j \end{bmatrix}$$

$$\begin{bmatrix} 1 & & & & & & & \\ & 1 & & & & & & \\ & & 1 & & & & & \\ & & & 1 & & & & \\ & & & & -1 & & & \\ & & & & & -1 & & \\ & & & & & & -1 & \\ & & & & & & & -1 \end{bmatrix},$$

$$\begin{bmatrix} 1 & & & & & & & \\ & 1 & & & & & & \\ & & 1 & & & & & \\ & & & 1 & & & & \\ & & & & -j & & & \\ & & & & & -j & & \\ & & & & & & -j & \\ & & & & & & & -j \end{bmatrix}$$

$$\begin{bmatrix} 1 & & & & & & & \\ & e^{j\varphi_1} & & & & & & \\ & & e^{j2\varphi_1} & & & & & \\ & & & e^{j3\varphi_1} & & & & \\ & & & & 1 & & & \\ & & & & & e^{j2\varphi_1} & & \\ & & & & & & e^{j3\varphi_1} & \\ & & & & & & & e^{j4\varphi_1} \end{bmatrix},$$

$$\begin{bmatrix} 1 & & & & & & & \\ & e^{j\varphi_2} & & & & & & \\ & & e^{j2\varphi_2} & & & & & \\ & & & e^{j3\varphi_2} & & & & \\ & & & & 1 & & & \\ & & & & & e^{j2\varphi_2} & & \\ & & & & & & e^{j3\varphi_2} & \\ & & & & & & & e^{j4\varphi_2} \end{bmatrix}$$

$$\begin{bmatrix} 1 & & & & & & & \\ & e^{j\varphi_3} & & & & & & \\ & & e^{j2\varphi_3} & & & & & \\ & & & e^{j3\varphi_3} & & & & \\ & & & & 1 & & & \\ & & & & & e^{j2\varphi_3} & & \\ & & & & & & e^{j3\varphi_3} & \\ & & & & & & & e^{j4\varphi_3} \end{bmatrix},$$

$$\begin{bmatrix} 1 & & & & & & & \\ & e^{j\varphi_4} & & & & & & \\ & & e^{j2\varphi_4} & & & & & \\ & & & e^{j3\varphi_4} & & & & \\ & & & & 1 & & & \\ & & & & & e^{j2\varphi_4} & & \\ & & & & & & e^{j3\varphi_4} & \\ & & & & & & & e^{j4\varphi_4} \end{bmatrix}$$

wherein $\varphi_1 = \frac{-\pi}{32}, \varphi_2 = \frac{-3\pi}{32}, \varphi_3 = \frac{3\pi}{32}, \varphi_4 = \frac{\pi}{32}$;

or the second codebook comprises: any two code words in $$\begin{bmatrix} 1 & & & & & & & \\ & 1 & & & & & & \\ & & 1 & & & & & \\ & & & 1 & & & & \\ & & & & 1 & & & \\ & & & & & 1 & & \\ & & & & & & 1 & \\ & & & & & & & 1 \end{bmatrix},$$

$$\begin{bmatrix} 1 & & & & & & & \\ & 1 & & & & & & \\ & & 1 & & & & & \\ & & & 1 & & & & \\ & & & & j & & & \\ & & & & & j & & \\ & & & & & & j & \\ & & & & & & & j \end{bmatrix},$$

$$\begin{bmatrix} 1 & & & & & & & \\ & 1 & & & & & & \\ & & 1 & & & & & \\ & & & 1 & & & & \\ & & & & -1 & & & \\ & & & & & -1 & & \\ & & & & & & -1 & \\ & & & & & & & -1 \end{bmatrix},$$

$$\begin{bmatrix} 1 & & & & & & & \\ & 1 & & & & & & \\ & & 1 & & & & & \\ & & & 1 & & & & \\ & & & & -j & & & \\ & & & & & -j & & \\ & & & & & & -j & \\ & & & & & & & -j \end{bmatrix}$$

plus any group in the following 2 groups of code words:

first group:

$$\begin{bmatrix} 1 & & & & & & & \\ & e^{ja_1} & & & & & & \\ & & e^{j2a_1} & & & & & \\ & & & e^{j3a_1} & & & & \\ & & & & 1 & & & \\ & & & & & e^{j2a_1} & & \\ & & & & & & e^{j3a_1} & \\ & & & & & & & e^{j4a_1} \end{bmatrix},$$

$$\begin{bmatrix} 1 & & & & & & & \\ & e^{ja_2} & & & & & & \\ & & e^{j2a_2} & & & & & \\ & & & e^{j3a_2} & & & & \\ & & & & 1 & & & \\ & & & & & e^{j2a_2} & & \\ & & & & & & e^{j3a_2} & \\ & & & & & & & e^{j4a_2} \end{bmatrix}$$

wherein $a_1 = \frac{\pi}{16}, a_2 = \frac{-\pi}{16}$;

second group:

$$\begin{bmatrix} 1 & & & \\ & e^{j\theta_1} & & \\ & & \circ & \\ & & & e^{j7\theta_1} \end{bmatrix}, \begin{bmatrix} 1 & & & \\ & e^{j\theta_2} & & \\ & & \circ & \\ & & & e^{j7\theta_2} \end{bmatrix}$$

wherein $\theta_1 = \frac{3\pi}{32}, \theta_2 = \frac{-3\pi}{32}$.

11. A method for performing feedback of channel information wherein the method is a multi-precision method for performing feedback of channel information, and the method comprises:
 a base station and a UE jointly saving two second codebooks used in different scenarios; and
 after judging a size of a rank according to the channel information, if the rank is 1, the UE using one second codebook corresponding to the rank as a second codebook used currently, and if the rank is 2, the UE using the other second codebook corresponding to the rank as a second codebook used currently;

one of the two second codebooks comprises the following code words:

$$\begin{bmatrix} 1 & & & & & & & \\ & 1 & & & & & & \\ & & 1 & & & & & \\ & & & 1 & & & & \\ & & & & 1 & & & \\ & & & & & 1 & & \\ & & & & & & 1 & \\ & & & & & & & 1 \end{bmatrix}, \begin{bmatrix} 1 & & & & & & & \\ & 1 & & & & & & \\ & & 1 & & & & & \\ & & & 1 & & & & \\ & & & & j & & & \\ & & & & & j & & \\ & & & & & & j & \\ & & & & & & & j \end{bmatrix}$$

$$\begin{bmatrix} 1 & & & & & & & \\ & 1 & & & & & & \\ & & 1 & & & & & \\ & & & 1 & & & & \\ & & & & -1 & & & \\ & & & & & -1 & & \\ & & & & & & -1 & \\ & & & & & & & -1 \end{bmatrix}, \begin{bmatrix} 1 & & & & & & & \\ & 1 & & & & & & \\ & & 1 & & & & & \\ & & & 1 & & & & \\ & & & & -j & & & \\ & & & & & -j & & \\ & & & & & & -j & \\ & & & & & & & -j \end{bmatrix}$$

the other second codebook comprises the following code words:

$$\begin{bmatrix} 1 & & & & & & & \\ & e^{j\varphi_1} & & & & & & \\ & & e^{j2\varphi_1} & & & & & \\ & & & e^{j3\varphi_1} & & & & \\ & & & & 1 & & & \\ & & & & & e^{j2\varphi_1} & & \\ & & & & & & e^{j3\varphi_1} & \\ & & & & & & & e^{j4\varphi_1} \end{bmatrix},$$

$$\begin{bmatrix} 1 & & & & & & & \\ & e^{j\varphi_2} & & & & & & \\ & & e^{j2\varphi_2} & & & & & \\ & & & e^{j3\varphi_2} & & & & \\ & & & & 1 & & & \\ & & & & & e^{j2\varphi_2} & & \\ & & & & & & e^{j3\varphi_2} & \\ & & & & & & & e^{j4\varphi_2} \end{bmatrix},$$

$$\begin{bmatrix} 1 & & & & & & & \\ & e^{j\varphi_3} & & & & & & \\ & & e^{j2\varphi_3} & & & & & \\ & & & e^{j3\varphi_3} & & & & \\ & & & & 1 & & & \\ & & & & & e^{j2\varphi_3} & & \\ & & & & & & e^{j3\varphi_3} & \\ & & & & & & & e^{j4\varphi_3} \end{bmatrix},$$

-continued $$\begin{bmatrix} 1 & & & & & & & \\ & e^{j\varphi_4} & & & & & & \\ & & e^{j2\varphi_4} & & & & & \\ & & & e^{j3\varphi_4} & & & & \\ & & & & 1 & & & \\ & & & & & e^{j2\varphi_4} & & \\ & & & & & & e^{j3\varphi_4} & \\ & & & & & & & e^{j4\varphi_4} \end{bmatrix}$$

wherein $\varphi_1 = \frac{-\pi}{32}, \varphi_2 = \frac{-3\pi}{32}, \varphi_3 = \frac{3\pi}{32}, \varphi_4 = \frac{\pi}{32}$;

or one of the two second codebooks comprises the following code words:

$$\begin{bmatrix} 1 & & \\ & e^{j\theta_1} & \\ & O & \\ & & e^{j7\theta_1} \end{bmatrix}, \begin{bmatrix} 1 & & \\ & e^{j\theta_2} & \\ & O & \\ & & e^{j7\theta_2} \end{bmatrix}, \begin{bmatrix} 1 & & \\ & e^{j\theta_3} & \\ & O & \\ & & e^{j7\theta_3} \end{bmatrix}$$

$$\begin{bmatrix} 1 & & \\ & e^{j\theta_4} & \\ & O & \\ & & e^{j7\theta_4} \end{bmatrix}$$

wherein $\theta_1 = \frac{-\pi}{64}, \theta_2 = \frac{-3\pi}{64}, \theta_3 = \frac{3\pi}{64}, \theta_4 = \frac{\pi}{64}$;

the other second codebook comprises the following code words:

$$\begin{bmatrix} 1 & & & & & & & \\ & e^{ja_1} & & & & & & \\ & & e^{j2a_1} & & & & & \\ & & & e^{j3a_1} & & & & \\ & & & & 1 & & & \\ & & & & & e^{j2a_1} & & \\ & & & & & & e^{j3a_1} & \\ & & & & & & & e^{j4a_1} \end{bmatrix},$$

$$\begin{bmatrix} 1 & & & & & & & \\ & e^{ja_2} & & & & & & \\ & & e^{j2a_2} & & & & & \\ & & & e^{j3a_2} & & & & \\ & & & & 1 & & & \\ & & & & & e^{j2a_2} & & \\ & & & & & & e^{j3a_2} & \\ & & & & & & & e^{j4a_2} \end{bmatrix}$$

$$\begin{bmatrix} 1 & & & & & & & \\ & e^{ja_3} & & & & & & \\ & & e^{j2a_3} & & & & & \\ & & & e^{j3a_3} & & & & \\ & & & & 1 & & & \\ & & & & & e^{j2a_3} & & \\ & & & & & & e^{j3a_3} & \\ & & & & & & & e^{j4a_3} \end{bmatrix},$$

$$\begin{bmatrix} 1 & & & & & & & \\ & e^{ja_4} & & & & & & \\ & & e^{j2a_4} & & & & & \\ & & & e^{j3a_4} & & & & \\ & & & & 1 & & & \\ & & & & & e^{j2a_4} & & \\ & & & & & & e^{j3a_4} & \\ & & & & & & & e^{j4a_4} \end{bmatrix}$$

wherein $a_1 = \frac{-\pi}{32}, a_2 = \frac{-3\pi}{32}, a_3 = \frac{3\pi}{32}, a_4 = \frac{\pi}{32}$.

12. The method according to claim 2 wherein, in the step of the UE performing feedback of the PMIs to the base station, the PMIs fed back are one of following situations:

a number of the PMIs fed back is S+1, corresponding code words are one code word in the first codebook and S code words in the second codebook used currently, S pairs of code words obtained by combining the code word in the first codebook and each code word in the S code words are used for representing channel information of S subbands respectively, and S is an integer greater than 1; or a number of the PMIs in the feedback is 2, and corresponding code words are one code word in the first codebook and one code word in the second codebook used currently, which are used for representing channel information of one subband; or a number of the PMIs in the feedback is 2, and corresponding code words are one code word in the first codebook and one code word in the second codebook used currently, which are used for representing channel information of one wideband.

13. The method according to claim 3 wherein, in the step of the UE performing feedback of the PMIs to the base station, the PMIs fed back are one of following situations:

a number of the PMIs fed back is S+1, corresponding code words are one code word in the first codebook and S code words in the second codebook used currently, S pairs of code words obtained by combining the code word in the first codebook and each code word in the S code words are used for representing channel information of S subbands respectively, and S is an integer greater than 1; or a number of the PMIs in the feedback is 2, and corresponding code words are one code word in the first codebook and one code word in the second codebook used currently, which are used for representing channel information of one subband; or a number of the PMIs in the feedback is 2, and corresponding code words are one code word in the first codebook and one code word in the second codebook used currently, which are used for representing channel information of one wideband.

* * * * *